PATENT NO. US 12,461,087 B2

(12) United States Patent
Albright et al.

(10) Patent No.: US 12,461,087 B2
(45) Date of Patent: Nov. 4, 2025

(54) FLUID INSPECTION USING MACHINE LEARNING

(71) Applicant: NVIDIA Corporation, Santa Clara, CA (US)

(72) Inventors: Ryan Kelsey Albright, Beaverton, OR (US); William Andrew Mecham, Elk Grove, CA (US); Tahir Cader, Spokane Valley, WA (US); Michael Scott Thompson, Wilsonville, OR (US); Aaron Richard Carkin, Hillsboro, OR (US); William Ryan Weese, Portland, OR (US); Benjamin Joseph Goska, Portland, OR (US); Marc Davis, Hillsboro, OR (US)

(73) Assignee: NVIDIA Corporation, Santa Clara, CA (US)

( * ) Notice: Subject to any disclaimer, the term of this patent is extended or adjusted under 35 U.S.C. 154(b) by 586 days.

(21) Appl. No.: 17/893,834

(22) Filed: Aug. 23, 2022

(65) Prior Publication Data

US 2024/0069005 A1 Feb. 29, 2024

(51) Int. Cl.
*G01N 33/28* (2006.01)
*G01N 11/02* (2006.01)
*G01N 21/90* (2006.01)
*G06N 20/00* (2019.01)

(52) U.S. Cl.
CPC ......... *G01N 33/2888* (2013.01); *G01N 11/02* (2013.01); *G01N 21/9072* (2013.01); *G06N 20/00* (2019.01)

(58) Field of Classification Search
CPC ........ G06N 20/00; G06N 3/0464; G06N 3/09; G01N 21/9072; G01N 11/02; G01N 33/2888
See application file for complete search history.

(56) References Cited

U.S. PATENT DOCUMENTS 10,605,702 B2 * 3/2020 Young ................ G01N 15/1404

* cited by examiner

*Primary Examiner* — An H Do
(74) *Attorney, Agent, or Firm* — Lowenstein Sandler LLP

(57) ABSTRACT

A method includes determining, using a processing device, a set of observations from coolant data, the coolant data being received from one or more sensors in an environment associated with a coolant. The method further includes determining, using a machine learning model and the set of observations, a contamination level of the coolant. The method also includes initiating an operation, using the processing device, responsive to determining the coolant contamination level.

16 Claims, 16 Drawing Sheets

FLUID INSPECTION USING MACHINE LEARNING

TECHNICAL FIELD

At least one embodiment pertains to a use of machine learning to perform and facilitate fluid inspection in a data center, according to various novel techniques described herein.

BACKGROUND

Data centers can store and process data for various purposes. Devices in the data center can utilize fluid (e.g., water, refrigerant, coolant, etc.) to ensure adequate and efficient cooling—e.g., use the coolant to remove thermal energy from power-intensive devices—e.g., graphics processing units (GPUs), central processing units (CPUs), data processing units (DPUs), etc. The fluid can become contaminated over time due to use—e.g., the fluid can become contaminated with organic matter or become acidic or basic. Contaminated fluids can reduce cooling efficiency and cause temperatures of the devices in the data center to increase. This can reduce performance and, in some cases, cause devices to go offline for maintenance. To reduce fluid contamination, conventional solutions manually test the fluid periodically—e.g., by withdrawing fluid samples periodically (e.g., once a month, once every two months, etc.). However, periodic inspections can fail to detect fluid contamination in a timely manner. Accordingly, often times fluid contamination is not discovered until it already impacts performance—e.g., fluid contamination is not discovered until high temperatures for the devices are detected, at which time performance of the system is already reduced.

BRIEF DESCRIPTION OF DRAWINGS

Various embodiments in accordance with the present disclosure will be described with reference to the drawings, in which.

DETAILED DESCRIPTION

Figure 1A:
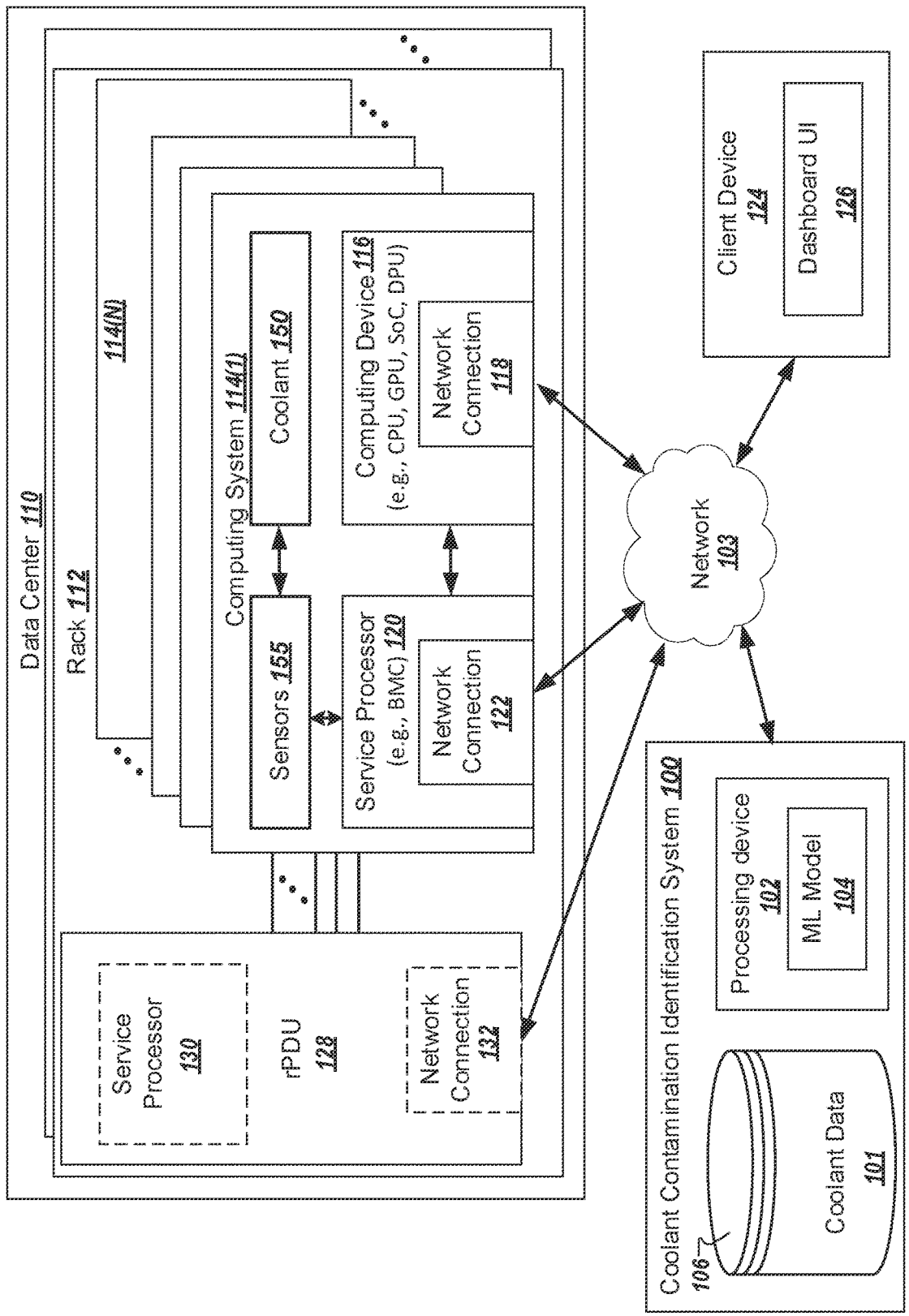
FIGS. 1A and 1B are example systems utilizing machine learning in job scheduling, in accordance with at least some embodiments.

Data centers can store and process data for various purposes. Devices in the data center can utilize fluid (e.g., water, refrigerant, coolant, etc.) to ensure adequate and efficient cooling—e.g., use the coolant to reduce thermal energy from power-intensive nodes—e.g., graphics processing units (GPUs), central processing units (CPUs), data processing units (DPUs), etc. The fluid can become contaminated over time due to use—e.g., the fluid can become contaminated with organic matter or become acidic or basic. For example, the fluid can be contaminated with bacteria or become corrosive over time. Contaminated fluids can reduce cooling efficiency and cause temperatures of the devices in the data center to increase. For example, organic matter can clog filters and reduce the cooling efficiency of the system. Increased temperatures can reduce performance and cause the data center to throttle performance. In some cases, the devices are shut down for maintenance, halting performance entirely. To detect fluid contamination, conventional solutions manually test the fluid periodically—e.g., by withdrawing fluid samples periodically (e.g., once a month, once every two months, etc.). The fluid sample is sometimes sent to a lab to get tested, causing time to elapse between sampling the fluid and determining the results. However, periodic inspections can fail to detect fluid contamination in a timely manner. Accordingly, often times fluid contamination is not discovered until it already impacts performance—e.g., fluid contamination is not discovered until high temperatures for the devices are detected, at which time performance of the system is already reduced.

Advantageously, aspects of the present disclosure can address the deficiencies above and other challenges by performing fluid inspection using a machine learning model. For example, a processing device can receive or retrieve information and data associated with a coolant from one or more sensors monitoring the coolant. For example, the coolant can be monitored by a light spectroscopy sensor, a fluid turbidity sensor, a pressure sensor, a pH level sensor, etc. In such examples, the processing device can receive measurements (e.g., a set of observations or insights) from the respective sensors—e.g., receive light spectroscopy measurement, a fluid turbidity measurement, a pressure measurement, and a pH level measurement. The processing logic can also receive or retrieve performance metrics—e.g., a power measurement, a temperature measurement, or a clock measurement. The processing logic periodically provides the machine learning model the information from the sensors and the power metrics to train the machine learning model to determine a contamination level of the coolant—e.g., determine whether the coolant is contaminated or uncontaminated. In some embodiments, the processing logic can train the machine learning model to determine a level of contamination—e.g., the machine learning model can be trained to determine a specific level of contamination from different levels of contaminations that are possible for the fluid. In one embodiment, the processing logic can train the machine learning model to predict if a fluid is to become contaminated—e.g., predict the fluid is to become contaminated based on a respective measurement exceeding a threshold value or rate of change of a respective measurement exceeding a threshold rate. The machine learning model could be an example of pattern detection, anomaly detection, or a classification model (e.g., trained to classify the fluid as contaminated if certain measurements are received). The machine learning model can be trained to monitor changes in the fluid over time and determine if the changes are associated with the fluid contamination. For example, the machine learning model can be provided a set of observations associated with uncontaminated fluid as a baseline—e.g., what various measurements are associated with the respective sensor when the power and temperature are efficient, and the fluid is uncontaminated. As the measurements change, the machine learning model can be trained to identify thermal consistencies, behavior, and other failure conditions (e.g., corrosion) to determine whether the fluid is contaminated and a contamination level. Examples include, but are not limited to, the machine learning model determining a respective measurement exceeds a threshold (e.g., a current fluid turbidity measurement exceeds a threshold fluid turbidity), determining a rate of change of a respective measurement exceeds a threshold rate of change for the respective measurement (e.g., the pressure of the fluid increased at a first rate that satisfies a threshold rate associated with the pressure measurement), or determining collective changes in one or more measurements indicate fluid contamination—e.g., turbidity decreased but pH levels increased indicating that bacteria may have died and contaminated the fluid. By receiving the information and training the machine learning model, the processing logic can build a profile for respective devices in the data center—e.g., unique profiles on a per product, per rack, or per data-center basis. If the processing logic determines there is contamination or determines a contamination level, the processing logic can raise an alert and initiate operations to remedy the contamination as described with reference to FIG. 2.

In some embodiments, the information determined by the machine learning model (e.g., whether the fluid is contaminated or uncontaminated or a contamination level and the associated power and thermal efficiency of the fluid) can be used to schedule operations in the data center. For example, the data center can include computer clusters (e.g., a set of computers operating as a single system). The processing logic can train the machine learning model with information from one portion or section of the computer cluster and the use the trained machine learning model for the entire computer cluster—e.g., determine a contamination level of the fluid at a respective portion of the computer cluster and the respective power and thermal efficiencies. This information can be used to determine which portions of the computer cluster to utilize for an operation—e.g., the processing logic can schedule operations at portions of the computer cluster with uncontaminated fluid and high power and thermal efficiency or at portions of the computer cluster with fluids having a low contamination level. It should be noted that the data can be collected remotely, and the machine learning model can be trained via a cloud infrastructure. In such embodiments, the machine learning model can be trained using information from a first data center and then implemented at additional data centers—e.g., the trained machine learning model can be used at a second data center. In one embodiment, the processing logic can schedule a maintenance operation for the fluid based on a level of contamination. For example, the processing logic can schedule an immediate maintenance operation if the level of contamination is relatively high—e.g., the performance of the system is being effected. In other examples, the processing logic can schedule a maintenance operation for a future time—e.g., the processing logic can schedule a maintenance operation two weeks out if the performance of the system if unaffected currently.

By using machine learning for determining fluid health the system can better determine whether a fluid is contaminated or uncontaminated automatically. As fluid contamination is detected more quickly (e.g., in real-time), the contamination can be removed faster and enable the system to avoid throttling or shutting down devices. This can lead to an overall increase in the performance of the data center. Additionally, information from the machine learning model can be used to more efficiently determine which portions of a computer cluster to perform operations on.

FIG. 1A is a block diagram of a system 100 implementing machine learning in job scheduling, according to at least one embodiment. The system 100 can include a data center 110 coupled to a network 103. In some embodiments, the system 100 can include a client device 124 coupled with the network 103.

The data center 110 can include a rack 112 of one or more computing systems 114(1)-114(N), where N is a positive integer equal to or greater than zero. Each computing system 114 can include a computing device 116 and a service processor 120. In at least one embodiment, the computing device 116 can be considered a node. In other embodiments, multiple computing devices 116 can be considered a node—e.g., a node can include one or more computing devices 116. In some embodiments, the computing device 116 can be an example of a graphics processing unit (GPU) or central processing unit (CPU). Although one computing device 116 is shown for each computing system 116, it should be noted each computing system 114 can include any number of computing devices 116 greater than one (1). In at least one embodiment, the service processor 120 is a baseboard management controller (BMC). The BMC can be part of an IPMI-type interface and can be located on a circuit board (e.g., motherboard) of the computing device 116 being monitored. The BMC can include one or more sensors that are operatively coupled to the computing device 116 or integrated within the computing device 116. The sensors of a BMC measure internal physical variables such as temperature, humidity, power-supply voltage, fan speeds, communications parameters, and operating system (OS) functions. The BMC can provide a way to manage a computer that may be powered off or otherwise unresponsive. The service processor 120 provides out-of-band functionality by collecting the power consumption data of the computing device 116 independently from the computing device's CPU, firmware, and OS. The service processor 120 can provide the power consumption data via a network connection 122 independent from a primary network connection 118 of the computing device 116. The service processor 120 can use the network connection 122 to the hardware itself rather than the OS or login shell to manage the computing device 116, even if the computing device 116 is powered off or otherwise unresponsive. Although one rack 112 is illustrated, the data center 110 can include any number of racks 112 equal to or greater than one (1). In at least one embodiment, each computing system 114 (e.g., or the set of computing systems 114(1) through 114(N)) can be an example of a computer cluster—e.g., a set of computers that work concurrently. For example, the computing system 114 can have each node set to perform a same operation scheduled and controlled by software. In at least one example, the computing system 114 can be an example of or include NVIDIA DGX servers and workstations.

In at least one embodiment, the rack 112 can be coupled with or include a rack power distribution unit (rPDU) 128—e.g., the rPDU 128 can be coupled with multiple racks 112, or each rack 112 can include an rPDU 128. In some embodiments, the rPDU 128 can provide power to computing device 116 of the rack 112 and computing systems 114. In some embodiments, the rPDU 128 can include a service processor 130 and be connected to the network via network connection 132.

In at least one embodiment, each computing system 114 includes coolant 150 (e.g., refrigerant, water, etc.). In some embodiments, the coolant 150 is configured to regulate and control a temperature of computing system 114—e.g., control and regulate a temperature of a respective device of computing system 114. In at least one embodiment, the coolant 150 becomes contaminated over time due to usage. For example, the coolant 150 can become contaminated due to organic material (e.g., bacteria) or become corrosive. Accordingly, the coolant 150 can be monitored by sensors 155 and a coolant contamination identification system 100. In at least one embodiment, sensors 155 can be an example of a light spectroscopy sensor. In such embodiments, the sensor 155 can use light spectroscopy on the coolant 150 to detect components of reflective light material within via the light that passes through the coolant 150 or light that is reflected by material within the coolant 150. In at least one embodiment, the sensor 155 can be an example of a fluid turbidity sensor. In such embodiments, the sensor 155 can transmit light from the side of the coolant 150 to the other side to determine a measure of turbidity—e.g., determine a nephelometric turbidity unit (NTU). In at least one embodiment, the sensor 155 can be an example of a pressure sensor. In some embodiments, the sensor 155 is an example of a potential of hydrogen (pH) level sensor. In some embodiments, the sensor 155 can measure the viscosity or conductivity of the coolant 150. In at least one embodiment, the data from the sensors 155 is transmitted to the coolant contamination identification system 100, as illustrated with reference to FIG. 1B.

In at least one embodiment, coolant contamination identification system 100 can include a data store 106 and a processing device 102. In some embodiments, the processing device 102 can include a machine learning model 104. The coolant contamination identification system 100 is configured to receive information from the data center 110. In some embodiments, the coolant contamination identification system 100 can receive coolant data (e.g., information associated with the coolant) from the sensors 155. In at least one embodiment, the coolant contamination identification system 100 can receive power and thermal information from the service processor 120—e.g., from the BMC. For example, the coolant contamination identification system 100 can receive power consumption information associated with devices of the computing system 114 (e.g., a maximum power, a minimum power, or an average power), temperatures of devices of the computing system 114, and clock information of devices of the computing system 114—e.g., that a device is running at a specified clock (e.g., clock frequency or clock rate).

In at least one embodiment, the processing device 102 is configured to store coolant data or power and thermal information at the data store 106. The processing device can determine a set of observations (e.g., insights) from the coolant data 101—e.g., changes in a respective measurement or determine each measurement at a specific time, etc. The processing device can determine whether the coolant (e.g., fluid) is contaminated using the ML model 104 and the set of observations. For example, the ML model 104 can be an example of or include a classification model, a feature detection model, an anomaly detection model, or a pattern recognition model. In some embodiments, the ML model 104 can receive the set of observations and classify whether the fluid is contaminated or uncontaminated—e.g., the ML model 104 can classify whether a set of measurements obtained from the sensors indicate the fluid is contaminated or uncontaminated. In at least one embodiment, the ML model 104 can determine whether the set of observations matches a contaminated fluid profile or an uncontaminated fluid profile—e.g., given the set of observations (e.g., features), determine which class the fluid belongs to. In some embodiments, the ML model 104 can determine the set of observations deviates or determine that anomaly indicating that the fluid is contaminated—e.g., determine whether the set of observations deviates from expected measurements when the fluid is uncontaminated. In at least one embodiment, the ML model 104 can receive several sets of observations. In such embodiments, the ML model 104 can predict the fluid will be contaminated based on determining a trend or pattern from the several sets of observations. Additional details regarding the ML model 104 are discussed with reference to FIG. 2. In at least one embodiment, the processing device 102 can output an indication the fluid is contaminated or uncontaminated. In at least one embodiment, the processing device 102 can transmit the indication to client device 124, such as displayed on a user interface (UI) dashboard 126.

Although the coolant contamination identification system 100 is illustrated as being outside the data center 110, in some embodiments, the coolant contamination system 100 is located within the data center 110. In some embodiments, the coolant contamination system 100 is coupled with additional data centers 110 (not illustrated).

Figure 1B:
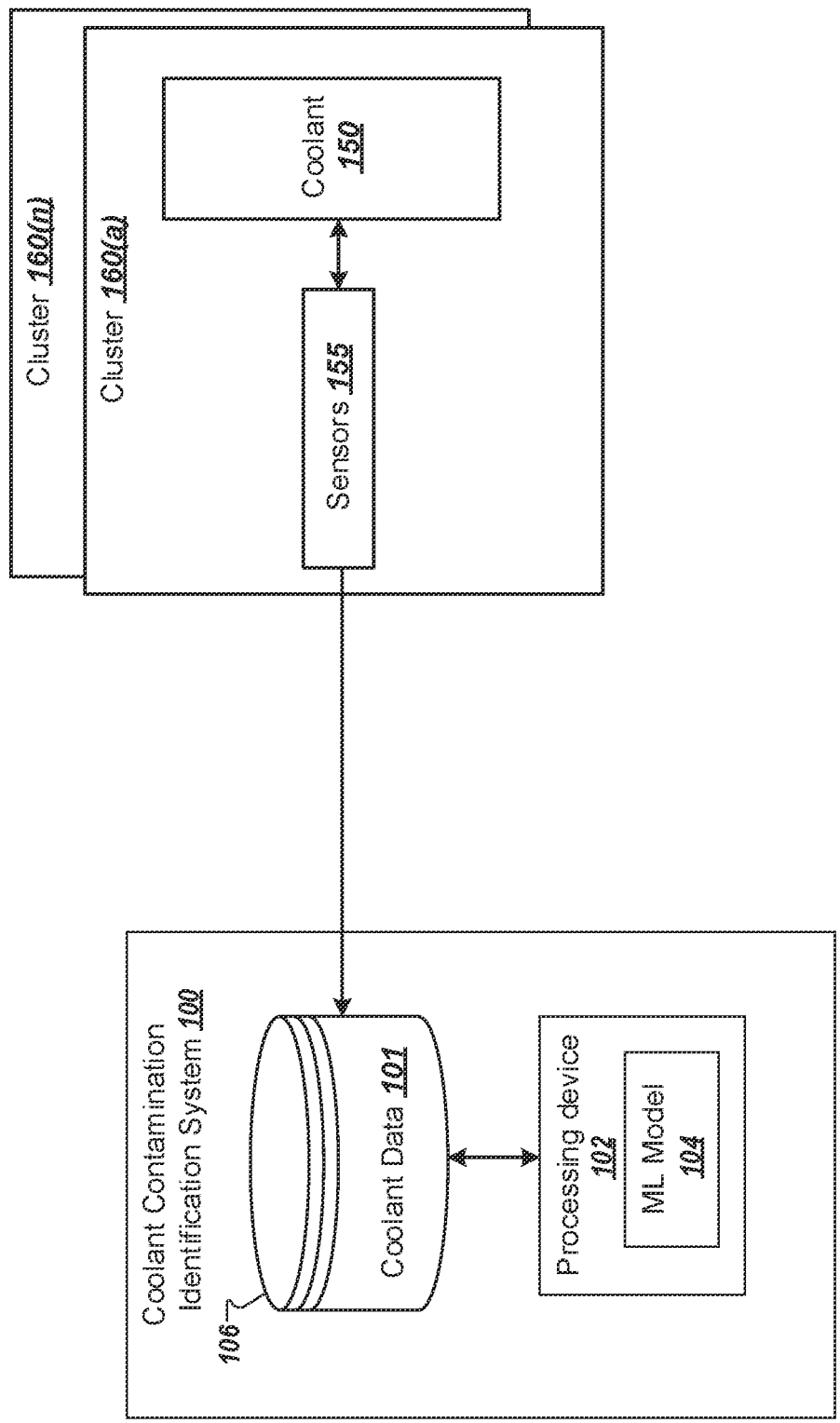

FIG. 1B is a block diagram of a coolant contamination identification system 100 collecting coolant data from one or more clusters 160, according to at least one embodiment. In at least one embodiment, cluster 160 is an example of a computer cluster or computing system 114 as described with reference to FIG. 1A. In at least one embodiment, each cluster 160(a) and cluster 160(n) is a unique cluster, each including sensors 155 and coolant 150. In at least one embodiment, cluster 160(a) and cluster 160(n) are portions of a larger cluster (e.g., clusters 160(a) through 160(n) collectively make up a cluster).

In at least one embodiment, the coolant contamination identification system 100 can receive coolant data from sensors 155 from each cluster or cluster portion 160. In at least one embodiment, the coolant contamination identification system 100 can store the data from the sensors 155 (e.g., the coolant data 101) at the data store 106. In such embodiments, the processing device 102 can utilize the coolant data 101 to determine a set of observations (e.g., insights) and train the ML model 104 to determine whether the fluid is contaminated or uncontaminated using the set of observations. In at least one embodiment, the ML model 104 can be trained for, or based on information from, a portion of a cluster—e.g., from cluster portion 160(a). In such embodiments, the processing device 102 can use the trained ML model 104 for the remaining cluster portions. For example, the processing device 102 can use the trained ML model 104 and a second set of observations associated with coolant data from cluster portion 160(*n*) to determine whether the coolant 150 at cluster portion 160(*n*) is contaminated or uncontaminated—e.g., the ML model 104 can be trained using data from a first portion and utilized for a second portion or all portions. In at least one embodiment, the ML model 104 can be trained for, or based on information from, a first cluster 160(*a*). In such embodiments, the processing device 102 can use the trained ML model 104 for a second cluster 160(*n*)—e.g., the ML model 104 can be trained using information from the first cluster 160(*a*) and implemented at a second cluster 160(*n*) to determine whether the coolant 150 at the second cluster 160(*n*) is contaminated or uncontaminated. In other embodiments, the ML model 104 can be trained with information from a first data center 110 and then implemented for a second data center 110 to determine whether the coolant at the second data center is contaminated or uncontaminated. Accordingly, the ML model 104 can be trained based on information from a single node and implemented in a larger cluster 160 or computing system 114.

In at least one embodiment, the processing device 102 can use information about whether the coolant 150 is contaminated or uncontaminated to schedule operations and jobs—e.g., the processing device 102 can transmit an indication to a job scheduler whether the coolant 150 is contaminated or uncontaminated, transmit an indication of a contamination level, or transmit an indication of a prediction the coolant 150 will become contaminated. For example, if the processing device 102 determines coolant 150 at the cluster 160(*a*) is contaminated, the processing device 102 can transmit an indication, and the data center 110 can schedule tasks at cluster 160(*n*)—e.g., the data center 110 can avoid scheduling jobs at clusters 160 with contaminated fluids. In at least one embodiment, the ML model 104 can be trained to indicate or predict performance of the device, cluster 160, computing system 114, or data center 110 based on receiving the set of observations and thermal and power information. For example, the ML model 104 can indicate coolant 150 of cluster 160(*a*) is not presently contaminated but that a received pH measurement, turbidity measurement, conductivity measurement, and viscosity measurement indicate a possible future contamination. In such examples, the data center 110 can schedule operations at other clusters 160 based on the ML model 104 determining the pressure and temperature are rising. Accordingly, the data center 110 can utilize the coolant contamination identification system 100 to not only determine whether coolant is contaminated or uncontaminated, but also to schedule operations.

In at least one embodiment, the coolant identification system 100 can initiate an operation to decontaminate the fluid, replace the fluid, or otherwise remedy the fluid contamination. For example, the processing device 102 can transmit an alert that the fluid is contaminated, a contamination level, or is predicted to become contaminated, initiate a contamination analysis, determine a temperature of all devices to see if performance is affected, initiate a coolant sample retrieval for chemical analysis, etc. In at least one embodiment, the fluid or coolant 150 retrieval is from the data center 110. In at least one embodiment, the fluid or coolant 150 retrieval is from a cooling distribution unit (CDU). In some embodiments, the fluid is retrieved by a user of the data center—e.g., a human. In at least one embodiment, the fluid or coolant 150 is retrieved by a robotic end-effector. Additional details regarding the operations after determining the fluid is contaminated are discussed with reference to FIG. 2.

Figure 2:
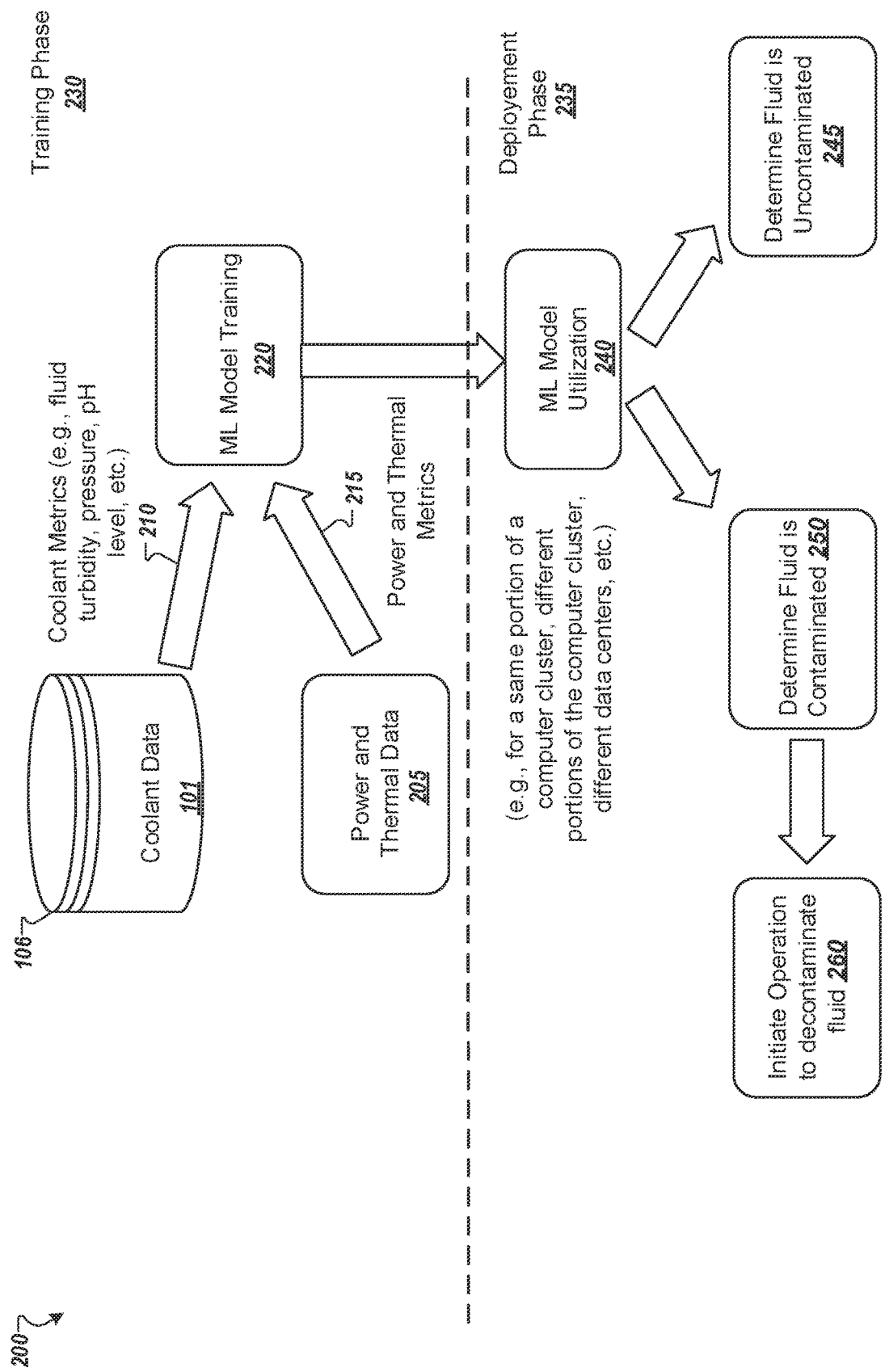
FIG. 2 illustrates an example data flow diagram illustrating fluid inspection using machine learning, in accordance with at least some embodiments.

FIG. 2 is an example data flow diagram of a process 200 for fluid inspection using machine learning, according to at least one embodiment. Process 200 can be performed by processing logic comprising hardware, software, firmware, or any combination thereof. The processing logic can be implemented in one or more computing devices, such as a first device for training an ML model and a second device for using the trained mode for classification, trend detection, anomaly detection, feature detection, etc. In at least one embodiment, process 200 is performed by coolant contamination identification system 100 of FIGS. 1A-1B. In another embodiment, the process 200 is performed by the processing device 102 of FIG. 1A.

In at least one embodiment, the process 200 includes a pipeline with a training phase 230 and a deployment phase 235. During the training phase 230, the processing logic can perform operations for data preparation of relevant observations, features, insights, etc., (e.g., pressure measurement, pH level measurement, turbidity measurement, light spectroscopy measurement, viscosity measurement, conductivity measurement, resistance measurement, power usage, temperature, and clock information) for training a machine learning (ML) model. In at least one embodiment, the data store 106 stores the coolant data 101. In at least one embodiment, the data store 106 also stores the power and thermal data 205. In at least one embodiment, the processing logic aggregates the coolant data 101 received from the sensors 155 into a set of observations 210 (e.g., specific coolant metrics, such as fluid turbidity, pressure, pH level at a specific time, or changes in the measurements, etc.). The set of observations 210 can also include viscosity measurements, conductivity measurements, etc.—e.g., the set of observations can include information relevant for the coolant 155. In at least one embodiment, the processing device 102 can request or receive power and thermal data 205. In at least one embodiment, the processing device 102 can request or receive the power and thermal data 205 from service processor 120 (e.g., from the BMC). In at least one embodiment, the processing device 102 can include the power and thermal data in the first set of observations or in a second set of observations. In some embodiments, the power and thermal metrics 215 can include temperature (e.g., average temperature, changes in temperature, minimum temperature, maximum temperature, etc.), power usage (e.g., maximum power, minimum power, average power), or clock information. In some embodiments, the power and thermal metrics 215 are associated with the coolant data 101 received from the sensors—e.g., the processing device 102 can receive or request power and thermal information associated with a device comprising the coolant at a time the sensors 155 collected the coolant data 101.

In at least one embodiment, the ML model training at block 220 can train ML model 104. In at least one embodiment, the one or more trained ML models 104 can include supervised learning models—e.g., support-vector machines, linear regression, logistic regression, Native Bayes, linear discriminant analysis, decision trees, k-nearest neighbor algorithm, neural networks, similarity learning, etc. In at least one embodiment, the ML model 104 can be trained to determine whether a fluid (e.g., coolant) is contaminated or uncontaminated via a classification model, pattern trending model, feature detection, anomaly detection, etc. Alternatively, other ML models can also be used.

In at least one embodiment, the ML model training at block 220 can provide, as inputs, the coolant metrics 210 (e.g., a set of observations) and the power and thermal metrics 215, to the ML model 104 to train the model to determine whether the fluid is contaminated or uncontaminated—e.g., the processing device 102 can train the ML model 104 based on the set of observations (e.g., metrics at a specific time) and the corresponding thermal and power metrics 215 at the specific time. For example, the ML model 104 can be provided a sequence of turbidity levels, pump rate, flow rate, changes in measurements, etc. In some embodiments, the ML model 104 can also be provided with respective thresholds for each measurement. For example, the ML model 104 can be provided with a threshold fluid turbidity measurement, threshold pressure measurement, threshold pH level measurement, threshold viscosity measurement, threshold conductivity measurement, threshold light spectroscopy measurement, etc. Accordingly, the ML model 104 can be trained to determine the fluid is contaminated if any of the respective threshold measurements are satisfied. For example, if a pressure measurement satisfies the threshold, it could indicate the coolant is clogged at some point in the pipeline due to contamination. In some embodiments, the ML model 104 can be trained for pattern detection. For example, the ML model 104 can be trained to determine whether fluid is contaminated based on a rate of change of a respective measurement—e.g., based on whether the rate of change of fluid turbidity satisfies a threshold rate of change for fluid turbidity. Additionally, the ML model 104 can be trained to predict the fluid will be contaminated based on the rate of change—e.g., the ML model 104 can determine the rate of change fluid turbidity will cause contamination even if the current temperature and power are at excepted levels. In at least one embodiment, the ML model 104 can be trained to determine if a fluid is contaminated based on the collective measurements of the set of observations. For example, the ML model 104 can be trained to determine the fluid is contaminated if fluid turbidity levels decrease but pH levels increased—e.g., the decrease in fluid turbidity and increase in pH levels could indicate bacteria died but that the bacteria existed in the first place could indicate fluid contamination. In at least one embodiment, the ML model training 220 can include an ML model evaluation that evaluates the model and makes changes to tune the ML model 104. In one embodiment, the ML model 104 can be trained to determine a contamination level—e.g., a level of contamination for the fluid. For example, the ML model training at block 220 can provide possible contamination levels for the fluid (e.g., based on a performance of the system). The ML model 104 can be trained to identify a current contamination level of the fluid from the possible contamination levels of the fluid.

Once trained in the training phase 230, the ML model 104 can be utilized during the deployment phase 235. In at least one embodiment, the ML model 104 can be utilized at the processing device 102 as described with reference to FIGS. 1A and 1B. In some embodiments, the ML model 104 can be trained with information from a first computer cluster portion, first computing system, or first data center, and then used at a second computer cluster portion, second computing system, or second data center as described with reference to FIG. 1B. For example, the ML model 104 can be trained with coolant data from a first computer cluster portion and then utilized to determine whether the coolant at the first computer cluster portion is contaminated or uncontaminated, a contamination level, or predict whether the fluid will become contaminated. In other embodiments, the ML model 104 can be trained with coolant data from the first computer cluster portion but utilized at a second computer cluster or at a second data center.

In at least one embodiment, the trained ML model 104 can receive coolant data (e.g., coolant information from sensors 155) and determine whether the fluid is contaminated or uncontaminated, a contamination level, or predict whether the fluid will become contaminated based on the coolant data. For example, the trained ML model 104 can receive fluid turbidity and conductivity measurements during the deployment phase 235. In at least one embodiment, the ML model 104 could also receive thermal information. Based on the fluid turbidity, conductivity measurements, and thermal information, the ML model 104 can determine whether the fluid is contaminated or uncontaminated or determine a contamination level for the fluid. For example, the ML model 104 can determine the fluid is at a first contaminated level if the fluid turbidity and temperatures are rising at a rate that exceeds a threshold rate—e.g., the increase could indicate algae growth and that the fluid is contaminated. In other embodiments, the ML model 104 can determine the fluid will become contaminated based on the fluid turbidity and temperatures are rising at the rate that exceeds a threshold rate. In at least one embodiment, the ML model 104 can determine whether the fluid is contaminated based on the fluid turbidity and temperatures rising at a rate that exceeds the threshold and receiving power and thermal information. In at least one embodiment, training the ML model 104 to determine whether the fluid is contaminated or uncontaminated or a contamination level for the fluid can also provide thermal and power efficiency information of the coolant. For example, the processing device 102 can determine contamination levels for the coolant and determine what the power and thermal levels of the respective contamination levels for the coolant are. Accordingly, the processing device 102 can determine thermal and power efficiency for each portion of the computing system 114 or computer cluster 160. In at least one embodiment, the processing logic 102 can utilize the thermal and power efficiency along with whether the fluid is contaminated or uncontaminated or a contamination level to schedule subsequent operations at the data center—e.g., the processing logic 102 can indicate to a job scheduler which portions are most thermal and power-efficient or which portions have the lowest contamination levels. Accordingly, the data center can schedule operations at different portions of the computer cluster from the information provided by the processing device 102.

In at least one embodiment, if the ML model 104 determines the fluid is uncontaminated, the process 200 proceeds to block 245. In some embodiments, if the ML model 104 determines the fluid is contaminated, the process proceeds to block 250.

At block 245, the processing device 102, using the ML model 104, can determine that the fluid is uncontaminated. In such embodiments, the coolant contamination identification system 100 can refrain from transmitting an alert, and the processing device 102 can provide additional coolant data to the ML model 104.

At block 250, the processing device 102, using the ML model 104, can determine that the fluid is contaminated. In such embodiments, the processing device 102 can transmit an alert that the fluid is contaminated—e.g., to the client device 124 or a user of the data center. In some embodiments, the fluid can be retrieved for further testing after the processing device 102 indicates the fluid is contaminated. In some embodiments, the fluid can be replaced after the processing device 102 indicates the fluid is contaminated. In at least one embodiment, the processing device 102, using the ML model 104, can determine a contamination level for the fluid.

At block 260, the processing device 102 (e.g., a user receiving the alert from the processing device 102) can initiate operations to decontaminate the fluid. For example, the processing device 102 can alert a customer of the data center 110. In such embodiments, data center services can be alerted, and a fluid maintenance operation can be scheduled. In at least one embodiment, the alert transmitted by the processing device 102 can cause a root-cause analysis to be initiated. In some embodiments, the findings of the root-cause analysis can be transmitted to other data centers that could similarly be affected—e.g., an alert indicating a certain training operation caused the coolant to become contaminated at a first data center could be transmitted to a second data center that executes the training operation. In at least one embodiment, the alert transmitted by the processing device 102 can cause device temperatures from all liquid-cooled devices to be obtained. In such embodiments, the processing device 102 can determine whether the temperature of all devices is trending higher. In some embodiments, this could indicate a clogging of a microchannel cold plate in the system. In at least one embodiment, the alert transmitted by the processing device 102 can cause a coolant chemical analysis to be performed. In such embodiments, the coolant chemical analysis can indicate if corrosion of metal components is occurring. In at least one embodiment, if corrosion is found, cooling loops can be pulled for service, and a destructive evaluation can be initiated. The coolant chemical analysis can also determine if the fluid contamination is a result of biological contamination. In at least one embodiment, the fluid is retrieved by a robot end-effector. In other embodiments, the fluid is retrieved by a user—e.g., a person. In at least one embodiment, the alert transmitted by the processing device 102 can cause a thermal resistance check of the cooling loop to occur. In such embodiments, after the alert by the processing device 102 that the fluid is contaminated, a server can perform self-diagnostics by executing workloads with known power consumption. This can enable the server to determine "thermal resistance" by determining how quickly temperatures raise and then resettle from the known workloads. In at least one embodiment, the thermal resistance calculation can be an optional check, and any of the other operations discussed can be performed after or before the "thermal resistance" calculation.

Figure 3:
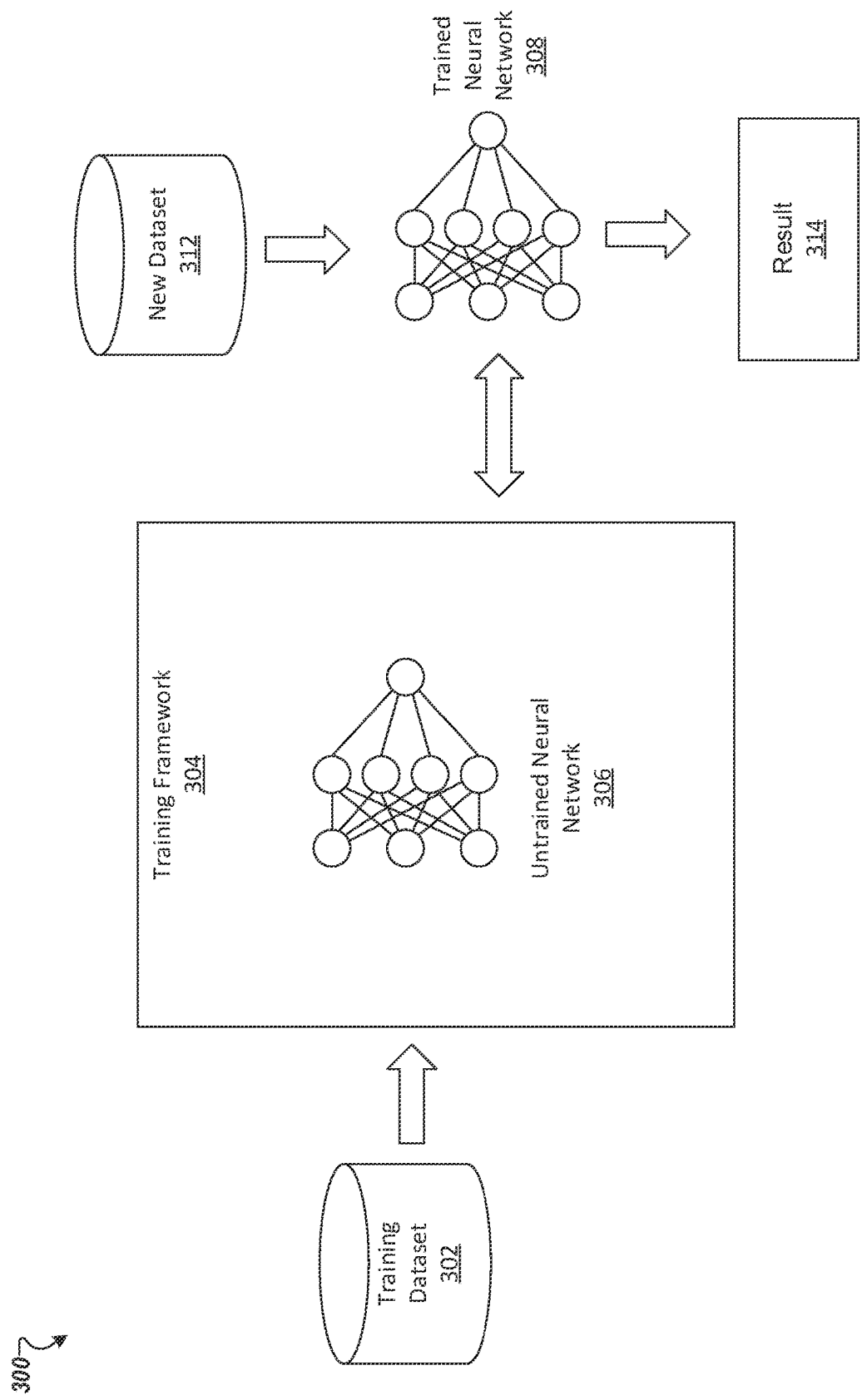
FIG. 3 illustrates a flow diagram of an example method for fluid inspection using machine learning, in accordance with at least some embodiments.

FIG. 3 illustrates training and deployment of a deep neural network, according to at least one embodiment. In at least one embodiment, untrained neural network 306 is trained using a training dataset 302. In at least one embodiment, training framework 304 is a PyTorch framework, whereas in other embodiments, training framework 304 is a Tensor-Flow, Boost, Caffe, Microsoft Cognitive Toolkit/CNTK, MXNet, Chainer, Keras, Deeplearning4j, or other training framework. In at least one embodiment, training framework 304 trains an untrained neural network 306 and enables it to be trained using processing resources described herein to generate a trained neural network 308. In at least one embodiment, weights may be chosen randomly or by pre-training using a deep belief network. In at least one embodiment, training may be performed in either a supervised, partially supervised, or unsupervised manner.

In at least one embodiment, untrained neural network 306 is trained using supervised learning, wherein training dataset 302 includes an input paired with a desired output for an input, or where training dataset 302 includes input having a known output and an output of neural network 306 is manually graded. In at least one embodiment, untrained neural network 306 is trained in a supervised manner using training dataset 302 and by comparing resulting outputs against a set of expected or desired outputs. In at least one embodiment, errors are propagated back through untrained neural network 306. In at least one embodiment, training framework 304 adjusts weights that control untrained neural network 306. In at least one embodiment, training framework 304 includes tools to monitor how well untrained neural network 306 is converging towards a model, such as trained neural network 308, suitable to generating correct answers, such as in result 314, based on input data such as a new dataset 312. In at least one embodiment, training framework 304 trains untrained neural network 306 repeatedly while adjusting weights to refine an output of untrained neural network 306 using a loss function and adjustment algorithm, such as stochastic gradient descent. In at least one embodiment, training framework 304 trains untrained neural network 306 until untrained neural network 306 achieves a desired accuracy. In at least one embodiment, trained neural network 308 can then be deployed to implement any number of machine learning operations.

In at least one embodiment, unsupervised learning training dataset 302 will include input data without any associated output data or "ground truth" data. In at least one embodiment, untrained neural network 306 can learn groupings within training dataset 302 and determine how individual inputs are related to untrained dataset 302. In at least one embodiment, unsupervised training can be used to generate a self-organizing map in trained neural network 308 capable of performing operations useful in reducing the dimensionality of new dataset 312. In at least one embodiment, unsupervised training can also be used to perform anomaly detection, which allows identification of data points in new dataset 312 that deviate from normal patterns of training datasets 302.

In at least one embodiment, semi-supervised learning may be used, which is a technique in which training dataset 302 includes a mix of labeled and unlabeled data. In at least one embodiment, training framework 304 may be used to perform incremental learning, such as through transferred learning techniques. In at least one embodiment, incremental learning enables trained neural network 308 to adapt to new dataset 312 without forgetting knowledge instilled within trained neural network 308 during initial training.

Figure 4:
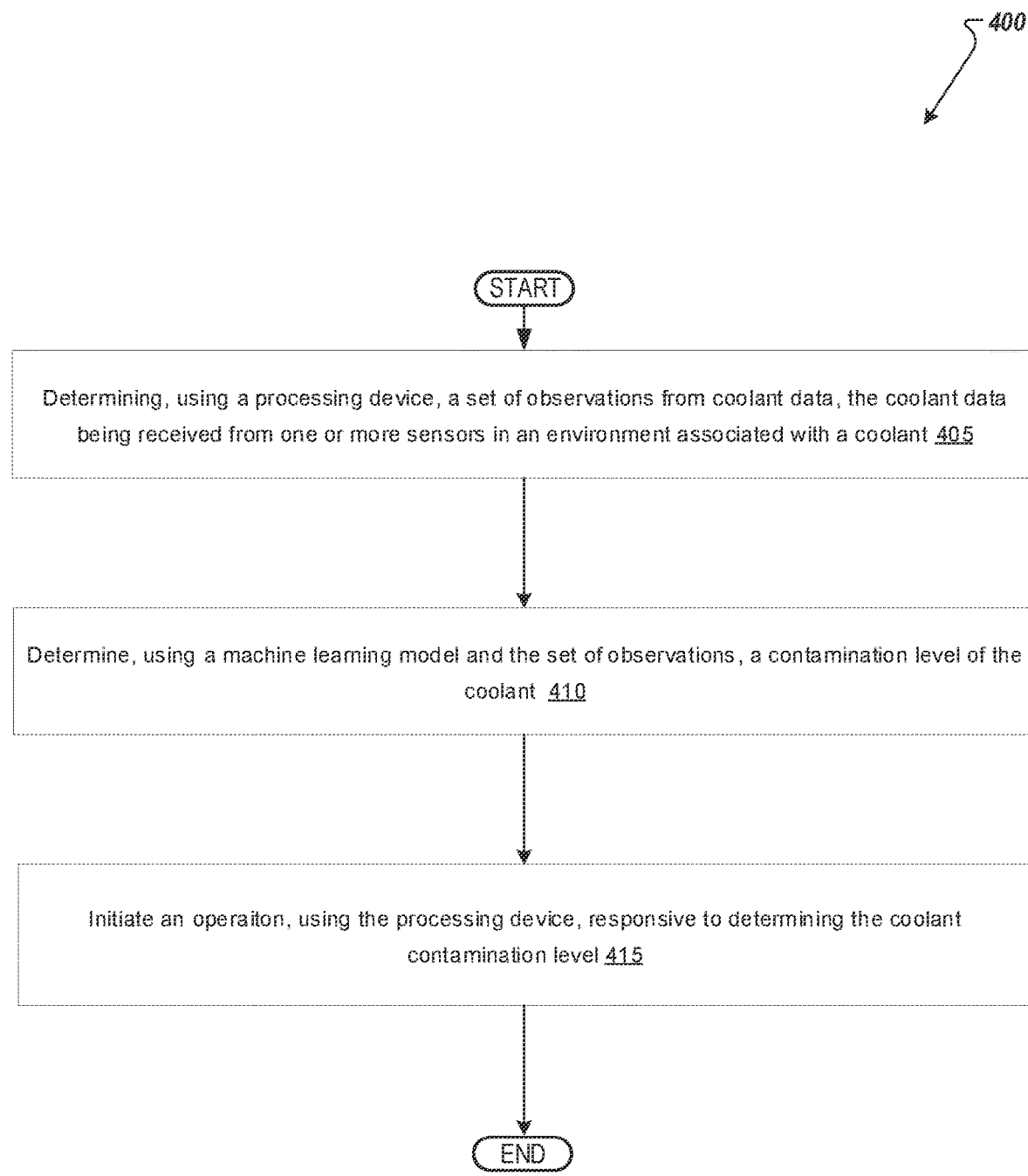
FIG. 4 illustrates a flow diagram of an example method for fluid inspection using machine learning, in accordance with at least some embodiments.

FIG. 4 illustrates a flow diagram of a method 400 for fluid inspection using machine learning, according to at least one embodiment. The method 400 can be performed by processing logic comprising hardware, software, firmware, or any combination thereof. In at least one embodiment, the method 400 is performed by system 100 as described with reference to FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for fluid inspection using machine learning are possible.

At operation 405, processing logic determines a set of observations (e.g., insights) from coolant data, the coolant data being received from one or more sensors in an environment associated with a coolant. In at least one embodiment, the one or more sensors include at least one of a light spectroscopy sensor, a fluid turbidity sensor, a pressure sensor, a potential hydrogen (pH) sensor, or a conductivity sensor. In at least one embodiment, the coolant data includes at least one of a turbidity measurement, a pressure measurement, a fluid turbidity measurement, a conductivity measurement, or a potential hydrogen (pH) level measurement. In some embodiments, the set of observations are associated with a change in at least one of the turbidity measurement, the pressure measurement, the fluid turbidity measurement, the conductivity measurement, or the potential hydrogen (pH) level measurement. In at least one embodiment, the coolant data collected by the one or more sensors is received remotely. In at least one embodiment, the processing logic determines a second set of observations from a second set of data, the second set of data including at least one of a power measurement, a temperature measurement, or a clock measurement, wherein detecting whether the coolant is contaminated or uncontaminated is based at least in part on using the second set of observations.

At operation 410, processing logic determines, using a machine learning model and the set of observations, a contamination level of the coolant. In at least one embodiment, the machine learning model comprises one of a classification model, a feature detection model, an anomaly detection model, or a pattern recognition model trained to detect whether the coolant is contaminated or uncontaminated. In at least one embodiment, to determine whether the coolant is contaminated or uncontaminated or a contamination level of the coolant, the processing logic detects a measurement associated with an observation of the set of observations that exceeds a threshold—e.g., a fluid turbidity measurement exceeds a threshold fluid turbidity amount. In other embodiments, to determine whether the coolant is contaminated or uncontaminated or a contamination level of the coolant, the processing logic determines a rate of change associated with an observation of the set of observations exceeding a threshold rate of change—e.g., a rate of change in the pH level measurement exceeds a threshold rate of change for pH levels. In some embodiments, the processing logic can determine whether the coolant is contaminated or uncontaminated or the contamination level of the coolant based on a combination of changes in several measurements—e.g., based on determining an increase in pressure and fluid turbidity. For example, the processing logic can infer an increase in pressure is caused by a filter that is clogged, and a clogged filter could be the result of the coolant being contaminated with biological contaminants. In other embodiments, the processing logic could determine a contamination level of the coolant if a device temperature is high and additional power is consumed—e.g., a power measurement received is relatively high or greater than an average power measurement received. For example, the processing logic could identify a cold plate is contaminated in the cooling system responsive to determining the increased temperature and power consumption. In at least one embodiment, the processing logic can determine whether the fluid is contaminated or a level of contamination responsive to receiving network information. For example, a coolant in a device can become contaminated and cause a device temperature to increase. In such embodiments, the device can slow performance and reduce an amount of data traffic consumed, processed, or executed. Accordingly, the processing logic could determine a coolant is contaminated responsive to receiving network information—e.g., receiving an indication that network traffic is slow or there is a reduction in data traffic processed.

In at least one embodiment, the processing logic, using a machine learning model and the set of observations, can identify a level of contamination responsive to determining the set of observations. For example, the machine learning model can be trained to identify how contaminated the coolant is—e.g., the machine learning model can be provided with all possible contamination levels and be trained to identify what the current contamination level of the coolant is. In at least one embodiment, a level of contamination can be associated with a performance or temperature of the system—e.g., a higher level of contamination can result in increased device temperature or reduced data traffic. In at least one embodiment, the processing logic can initiate an operation to be performed responsive to determining the level of contamination. For example, the processing logic can determine a lower level of contamination and schedule an operation for the coolant at a later time (e.g., after a couple of weeks). In other examples, the processing logic can determine higher levels of contamination and schedule an operation for the coolant as soon as possible. In at least one embodiment, to detect the coolant is contaminated or uncontaminated or a contamination level, the processing logic can further determine, using the machine learning model and the set of observations, the coolant is becoming (e.g., will become) contaminated responsive to determining the set of observations. In at least one embodiment, the machine learning model can be trained to predict if a coolant will become contaminated—e.g., based on a rate of change of a measurement as described with reference to FIG. 2. In such embodiments, the machine learning model can indicate based on the received set of observations that the coolant is trending towards contamination. In at least one embodiment, the processing logic can schedule an operation to be performed responsive to the machine learning model detecting—e.g., the processing logic can initiate a coolant maintenance operation before the fluid is contaminated responsive to the machine learning model determining the coolant is becoming contaminated.

At operation 415, processing logic can cause an operation to be performed responsive to determining a contamination level of the coolant. In at least one embodiment, the alert indicates a level of contamination for the coolant. In some embodiments, the alert indicates a prediction the coolant is becoming contaminated—e.g., that the coolant is not currently contaminated but the received measurements indicate a trend that will lead to coolant contamination. In at least one embodiment, the operation comprises one of transmitting an alert, initiating a contamination analysis, determining a temperature of one or more devices of the environment, initiating a fluid analysis, or determining a thermal resistance of one or more devices associated with the fluid. For example, the alert can be transmitted to a customer of the data center and initiate scheduling of a fluid maintenance operation. In some embodiments, the contamination analysis can be an example of a root-cause analysis. In such embodiments, processing logic can initiate a coolant maintenance in response to performing the root-cause analysis. In at least one embodiment, the processing logic can transmit the alert to one or more additional data centers—e.g., data centers globally can receive the alert to ensure similar contamination issues are not present. In some embodiments, the processing logic studies device temperature from all liquid-cooled devices to determine if the respective device temperature is increasing. In such embodiments, increasing temperature can indicate contamination at microchannel cold plates—e.g., clogging occurs at the microchannel cold plates. In some embodiments, the fluid analysis could determine if corrosion of metal components. In at least one embodiment, cooling loops (e.g., components associated with the coolant) can be serviced to evaluate the corrosion. In at least one embodiment, the processing logic can determine the contamination is a result of biological contamination. In at least one embodiment, the fluid retrieval is from a device of the environment. In some embodiments, the fluid retrieval is from a cooling distribution unit (CDU). In at least one embodiment, the processing logic can initiate self-diagnosis from known thermal resistances—e.g., a measurement of a temperature difference or heat property indicating a resistance to heat flow of a device (e.g., property of a heat sink in a cooling system). For example, if the processing logic determines that there is contamination, a server can initiate the self-diagnosis by executing an operation with a predictable power enabling a calculation of the thermal resistance—e.g., based on how quickly the temperature rises and resettles. In at least one embodiment, the processing logic can receive second coolant data from the one or more sensors. In such embodiments, the processing logic can determine a second set of observations from the second coolant data. In at least one embodiment, the processing logic can determine, using the machine learning model and the second set of observations, a second contamination level of the coolant. In at least one embodiment, the processing logic can refrain from initiating the operation responsive to detecting the coolant is uncontaminated.

Figure 5:
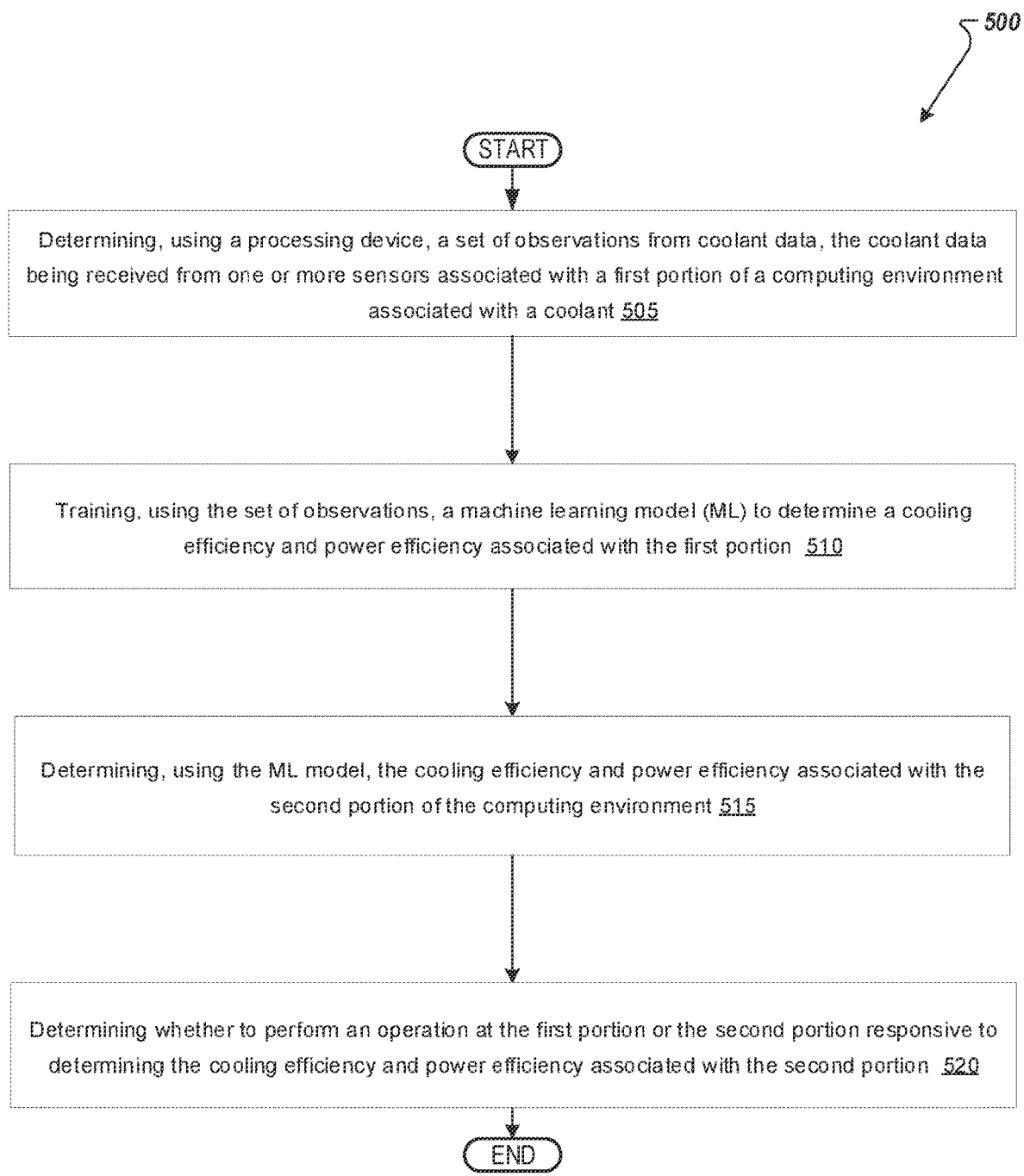
FIG. 5 illustrates a flow diagram of an example method for fluid inspection using machine learning, in accordance with at least some embodiments.

FIG. 5 illustrates a flow diagram of a method 500 for fluid inspection using machine learning, according to at least one embodiment. The method 500 can be performed by processing logic comprising hardware, software, firmware, or any combination thereof. In at least one embodiment, the method 500 is performed by system 100 as described with reference to FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for fluid inspection using machine learning are possible.

At operation 505, processing logic determines a set of observations from coolant data, the coolant data being received from one or more sensors associated with a first portion of a computing environment associated with a coolant. For example, as described with reference to FIGS. 1A and 1B, the computing environment can include one or more computer clusters—e.g., sets of computers that execute an operation as a single system. In such examples, the processing logic can receive coolant data from a portion of the computer cluster (e.g., the first portion).

At operation 510, processing logic trains, using the set of observations, a machine learning model (ML) to determine a cooling efficiency and power efficiency associated with the first portion. In at least one embodiment, the set of observations can correspond to one of a turbidity measurement, a pressure measurement, a fluid turbidity measurement, a conductivity measurement, or a potential hydrogen (pH) level measurement. In some embodiments, the set of observations can correspond to a change in one of the turbidity measurement, a pressure measurement, a fluid turbidity measurement, a conductivity measurement, or a potential hydrogen (pH) level measurement.

At operation 515, processing logic determines the cooling efficiency and power efficiency associated with a second portion of the computing environment. In some embodiments, the processing logic can train the machine learning model based on the set of observations of the first portion (e.g., based on the set of observations from a first node executing a single stream of data) and apply the trained machine learning model to the entire computer cluster or different portions of the computer cluster—e.g., to the second portion. Accordingly, the processing logic can use perceived or anticipated performance from the coolant in the first portion for the rest of the computer cluster. In at least one embodiment, the processing logic determines a second set of observations from a second coolant data, the second coolant data received from a second set of one or more sensors associated with the second portion of the computing environment. In such embodiments, the processing logic can determine the cooling efficiency and power efficiency associated with the second portion based on determining the second set of observations—e.g., the processing logic can input the second set of observations to the machine learning model to determine the cooling and power efficiency of the second portion.

At operation 520, processing logic determines whether to perform an operation at the first portion or the second portion responsive to determining the cooling efficiency and power efficiency associated with the second portion. In some embodiments, the computing environment comprises a plurality of portions, including the first portion and the second portion. In such embodiments, the processing logic determines, using the ML model, a second cooling efficiency and power efficiency associated with each portion of the plurality of portions—e.g., based on receiving a respective set of observations from each portion of the plurality of portions. In some embodiments, the processing logic can determine a third portion to perform a second operation responsive to determining the second cooling efficiency and power efficiency associated with each portion of the plurality of portions. In some embodiments, the processing logic can determine which portions of the computer cluster to perform operations at based on the cooling and power efficiency determined for each portion.

Figure 6A:
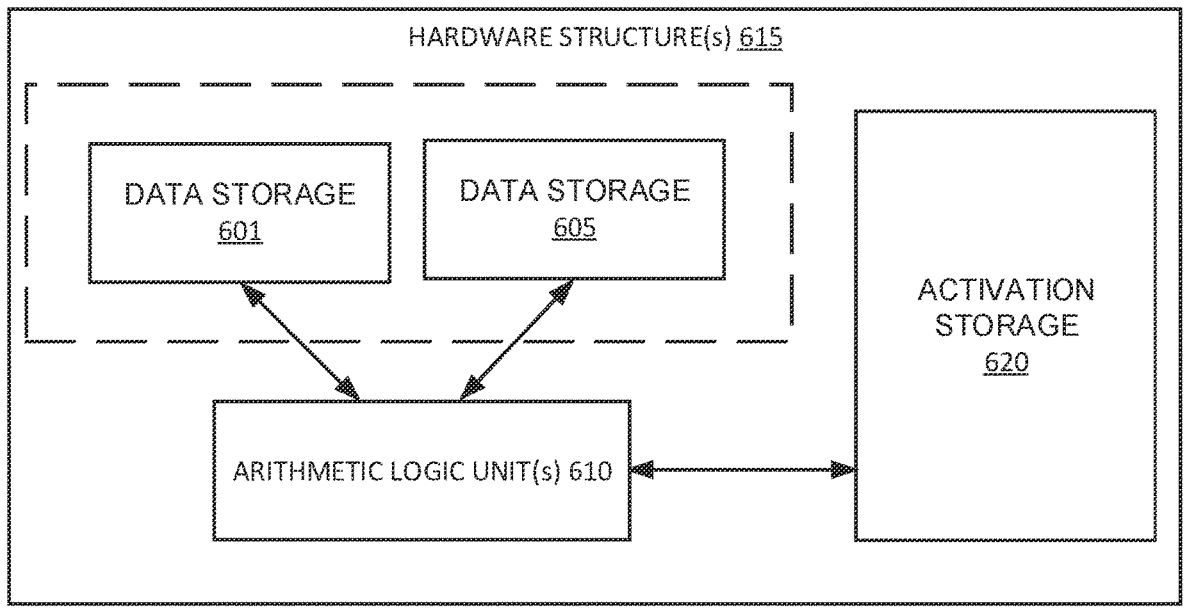
FIG. 6A illustrates an inference and/or training logic, in accordance with at least some embodiments.

FIG. 6A illustrates inference and/or training logic 615 used to perform inferencing and/or training operations associated with one or more embodiments. Details regarding inference and/or training logic 615 are provided below in conjunction with FIGS. 6A and/or 6B.

In at least one embodiment, inference and/or training logic 615 may include, without limitation, code and/or data storage 601 to store forward and/or output weight and/or input/output data, and/or other parameters to configure neurons or layers of a neural network trained and/or used for inferencing in aspects of one or more embodiments. In at least one embodiment, training logic 615 may include, or be coupled to code and/or data storage 601 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 601 may be included with other on-chip or off-chip data storage, including a processor's L1, L2, or L3 cache or system memory.

In at least one embodiment, any portion of code and/or data storage 601 may be internal or external to one or more processors or other hardware logic devices or circuits. In at least one embodiment, code and/or code and/or data storage 601 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 601 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 615 may include, without limitation, a code and/or data storage 605 to store backward and/or output weight and/or input/output data corresponding to neurons or layers of a neural network trained and/or used for inferencing in aspects of one or more embodiments. In at least one embodiment, code and/or data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 615 may include, or be coupled to code and/or data storage 605 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 605 may be included with other on-chip or off-chip data storage, including a processor's L1, L2, or L3 cache or system memory. In at least one embodiment, any portion of code and/or data storage 605 may be internal or external to on one or more processors or other hardware logic devices or circuits. In at least one embodiment, code and/or data storage 605 may be cache memory, DRAM, SRAM, non-volatile memory (e.g., Flash memory), or other storage. In at least one embodiment, choice of whether code and/or data storage 605 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 601 and code and/or data storage 605 may be separate storage structures. In at least one embodiment, code and/or data storage 601 and code and/or data storage 605 may be same storage structure. In at least one embodiment, code and/or data storage 601 and code and/or data storage 605 may be partially same storage structure and partially separate storage structures. In at least one embodiment, any portion of code and/or data storage 601 code and/or data storage 605 may be included with other on-chip or off-chip data storage, including a processor's L1, L2, or L3 cache or system memory.

In at least one embodiment, inference and/or training logic 615 may include, without limitation, one or more arithmetic logic unit(s) ("ALU(s)") 610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 620 that are functions of input/output and/or weight parameter data stored in code and/or data storage 601 and/or code and/or data storage 605. In at least one embodiment, activations stored in activation storage 620 are generated according to linear algebraic and or matrix-based mathematics performed by ALU(s) 610 in response to performing instructions or other code, wherein weight values stored in code and/or data storage 605 and/or code and/or data storage 601 are used as operands along with other values, such as bias values, gradient information, momentum values, or other parameters or hyperparameters, any or all of which may be stored in code and/or data storage 605 or code and/or data storage 601 or another storage on or off-chip.

In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 601, code and/or data storage 605, and activation storage 620 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., Flash memory), or other storage. In at least one embodiment, activation storage 620 may be completely or partially within or external to one or more processors or other logical circuits. In at least one embodiment, choice of whether activation storage 620 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 615 illustrated in FIG. 6A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6A may be used in conjunction with central processing unit ("CPU") hardware, graphics processing unit ("GPU") hardware or other hardware, such as data processing unit ("DPU") hardware, or field programmable gate arrays ("FPGAs").

Figure 6B:
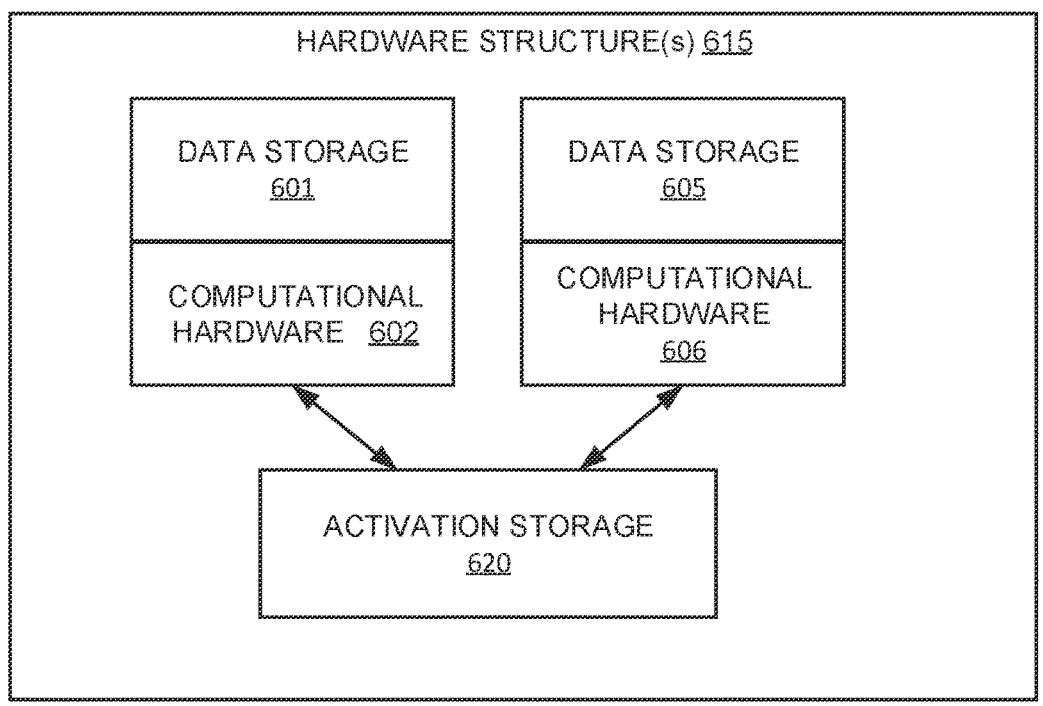
FIG. 6B illustrates an inference and/or training logic, in accordance with at least some embodiments.

FIG. 6B illustrates inference and/or training logic 615, according to at least one or more embodiments. In at least one embodiment, inference and/or training logic 615 may include, without limitation, hardware logic in which computational resources are dedicated or otherwise exclusively used in conjunction with weight values or other information corresponding to one or more layers of neurons within a neural network. In at least one embodiment, inference and/or training logic 615 illustrated in FIG. 6B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 615 includes, without limitation, code and/or data storage 601 and code and/or data storage 605, which may be used to store code (e.g., graph code), weight values and/or other information, including bias values, gradient information, momentum values, and/or other parameter or hyperparameter information. In at least one embodiment illustrated in FIG. 6B, each of code and/or data storage 601 and code and/or data storage 605 is associated with a dedicated computational resource, such as computational hardware 602 and computational hardware 606, respectively. In at least one embodiment, each of computational hardware 602 and computational hardware 606 comprises one or more ALUs that perform mathematical functions, such as linear algebraic functions, only on information stored in code and/or data storage 601 and code and/or data storage 605, respectively, result of which is stored in activation storage 620.

In at least one embodiment, each of code and/or data storage 601 and 605 and corresponding computational hardware 602 and 606, respectively, correspond to different layers of a neural network, such that resulting activation from one "storage/computational pair 601/602" of code and/or data storage 601 and computational hardware 602 is provided as an input to "storage/computational pair 605/606" of code and/or data storage 605 and computational hardware 606, in order to mirror conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage computation pairs 601/602 and 605/606 may be included in inference and/or training logic 615.

Figure 7:
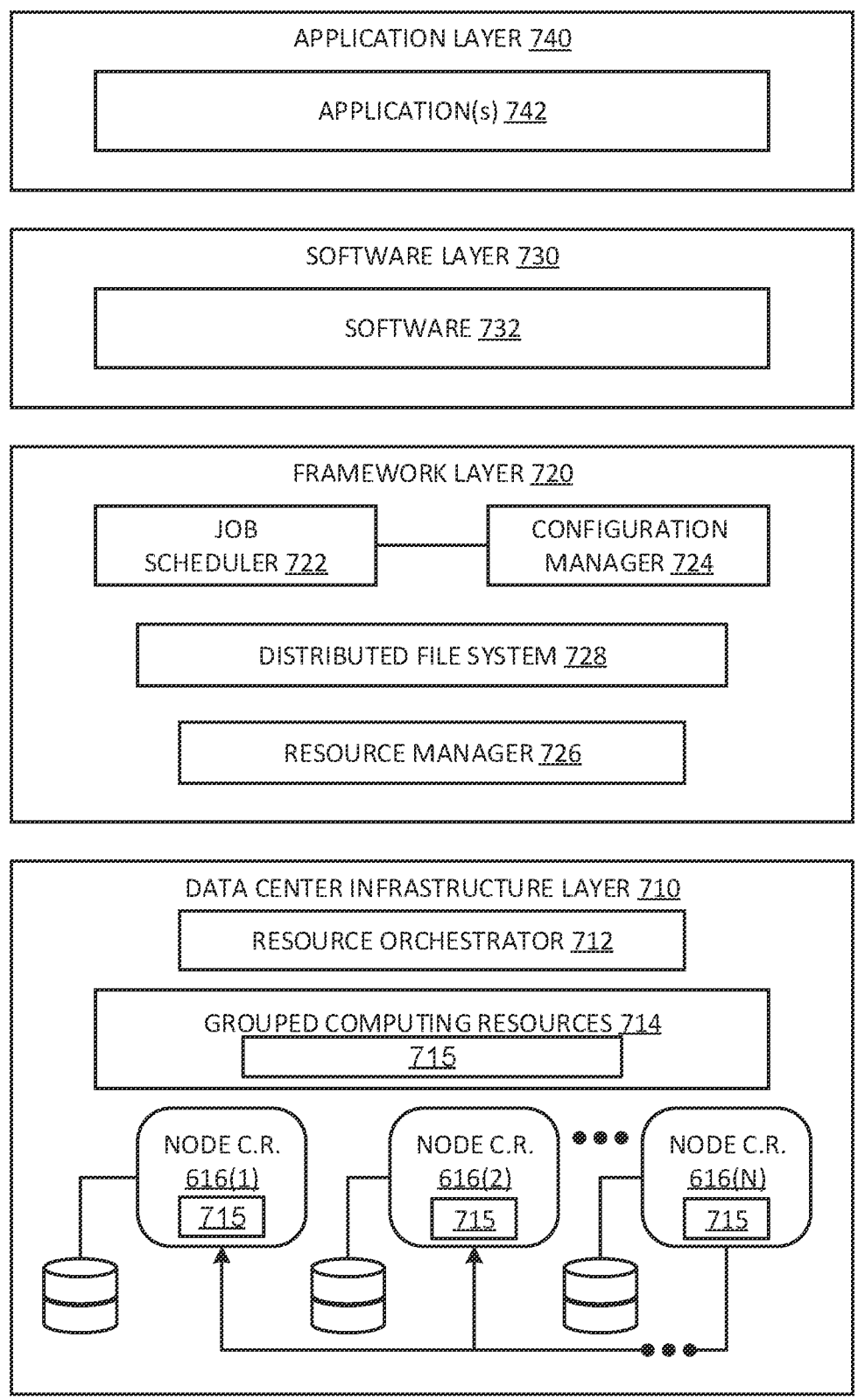
FIG. 7 illustrates an example data center system, in accordance with at least some embodiments.

FIG. 7 illustrates an example data center 700, in which at least one embodiment may be used. In at least one embodiment, data center 700 includes a data center infrastructure layer 710, a framework layer 720, a software layer 730, and an application layer 1240.

In at least one embodiment, as shown in FIG. 7, data center infrastructure layer 710 may include a resource orchestrator 712, grouped computing resources 714, and node computing resources ("node C.R.s") 616(1)-616(N), where "N" represents any whole, positive integer. In at least one embodiment, node C.R.s 616(1)-616(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 616(1)-616(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 616(1)-616(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 616(1)-616(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 8:
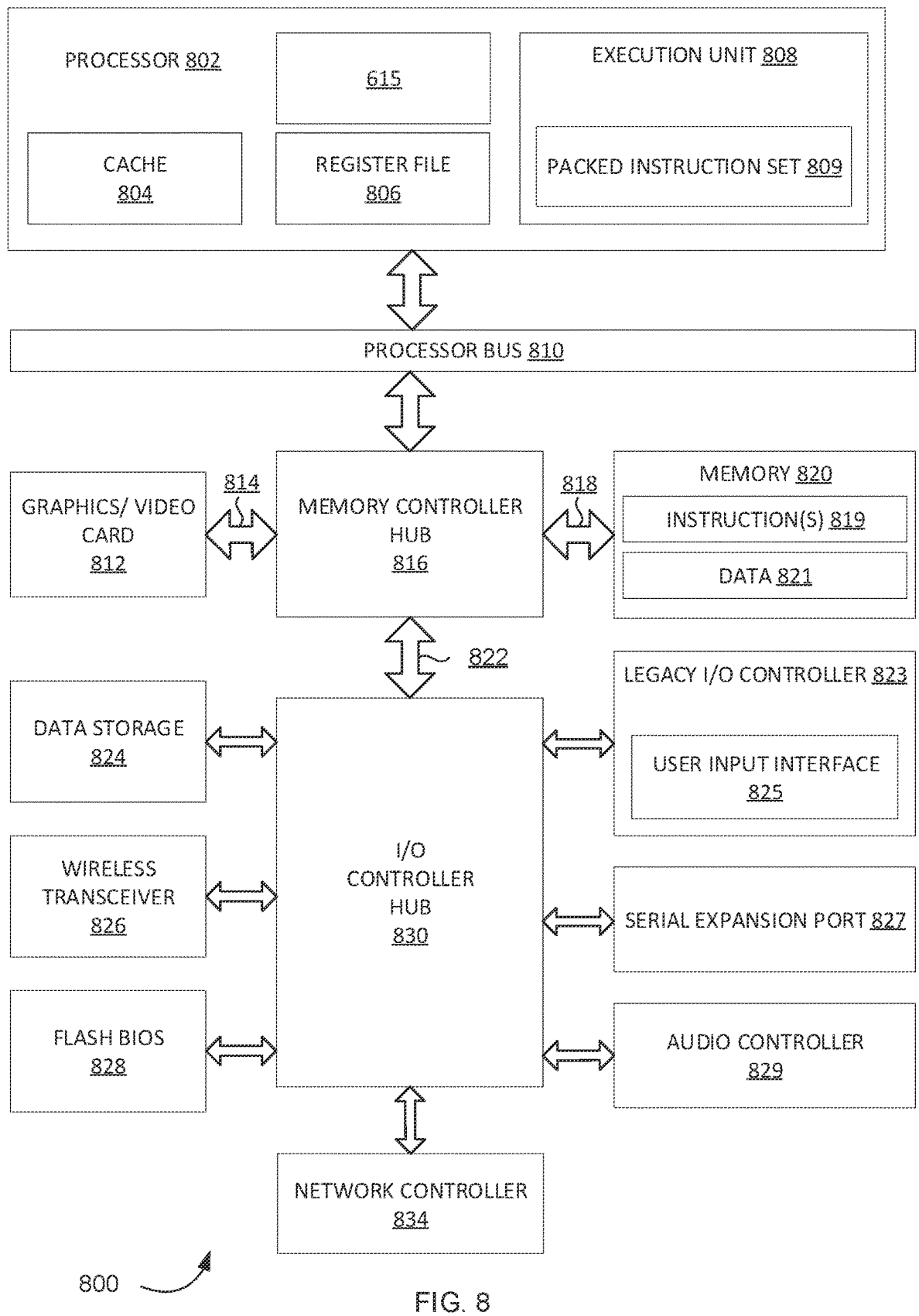
FIG. 8 illustrates a computer system, in accordance with at least some embodiments.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834, which may include in some embodiments, a data processing unit. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
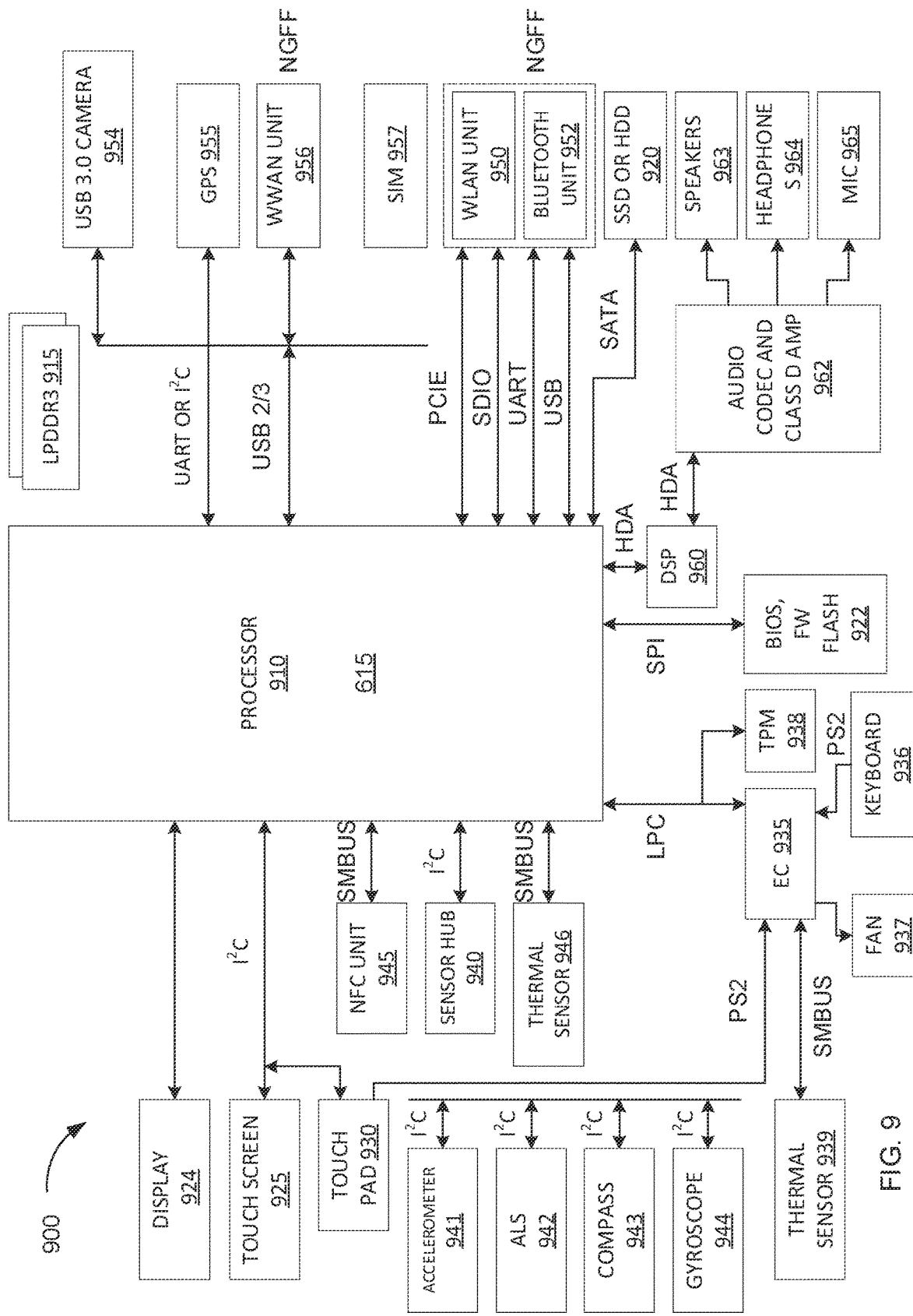
FIG. 9 illustrates a computer system, in accordance with at least some embodiments.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 936, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 10:
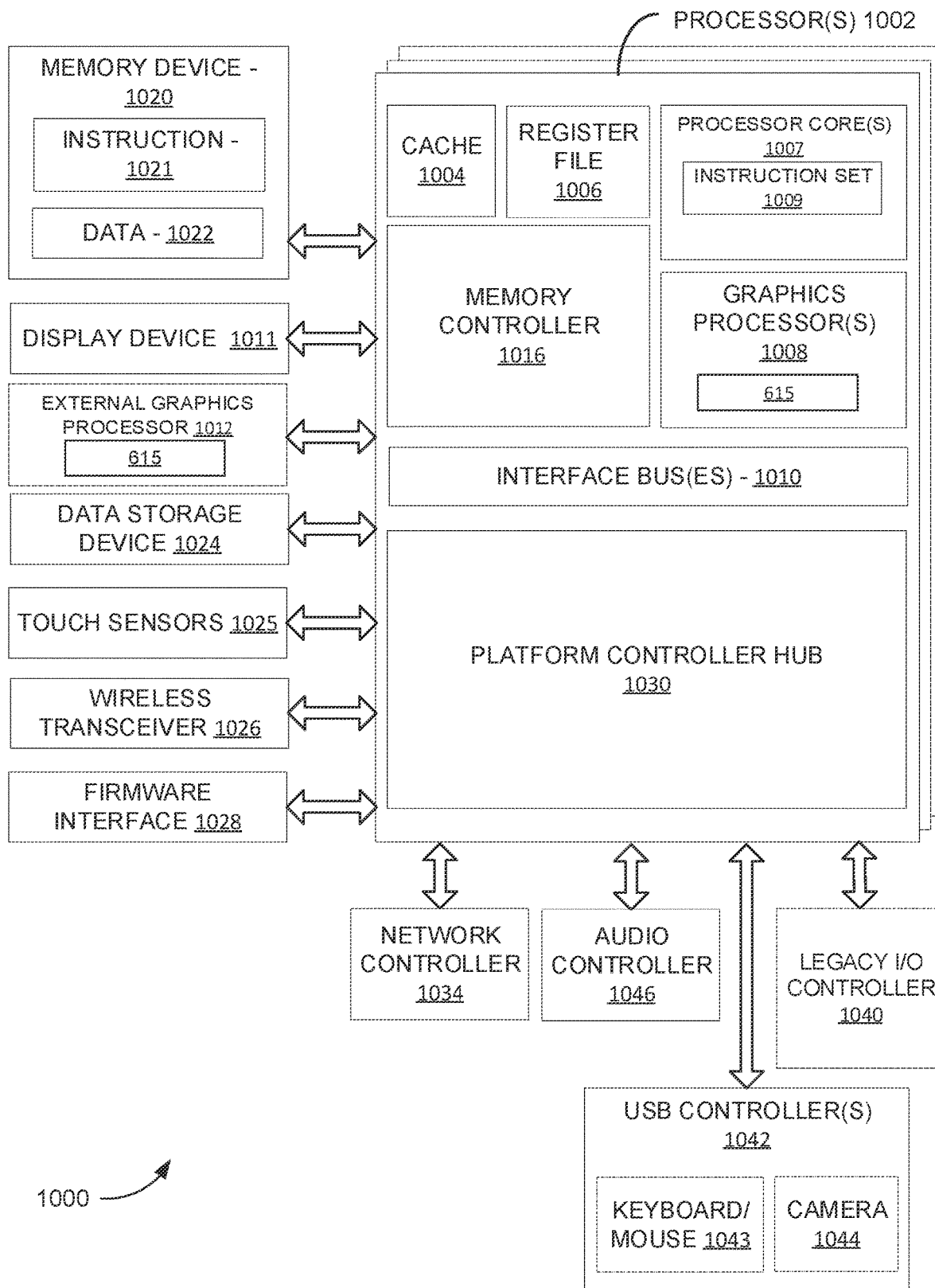
FIG. 10 illustrates at least portions of a graphics processor, in accordance with at least some embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, edge, or embedded devices.

In at least one embodiment, system 1000 may include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 may also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 may have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, may be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 may be a dynamic random access memory (DRAM) device, a static random access memory (SRAM) device, flash memory device, phase-change memory device, or some other memory device having suitable performance to serve as process memory. In at least one embodiment memory device 1020 may operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 may connect to processor(s) 1002. In at least one embodiment display device 1011 may include one or more of an internal display device, as in a mobile electronic device or a laptop device or an external display device attached via a display interface (e.g., DisplayPort, etc.). In at least one embodiment, display device 1011 may include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 may connect via a storage interface (e.g., SATA) or via a peripheral bus, such as a Peripheral Component Interconnect bus (e.g., PCI, PCI Express). In at least one embodiment, touch sensors 1025 may include touch screen sensors, pressure sensors, or fingerprint sensors. In at least one embodiment, wireless transceiver 1026 may be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and may be, for example, a unified extensible firmware interface (UEFI). In at least one embodiment, network controller 1034 may enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 may also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1011. In at least one embodiment, platform controller hub 1030 and/or memory controller 1016 may be external to one or more processor(s) 1002. For example, in at least one embodiment, system 1000 may include an external memory controller 1016 and platform controller hub 1030, which may be configured as a memory controller hub and peripheral controller hub within a system chipset that is in communication with processor(s) 1002.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into graphics processor 1008. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 11:
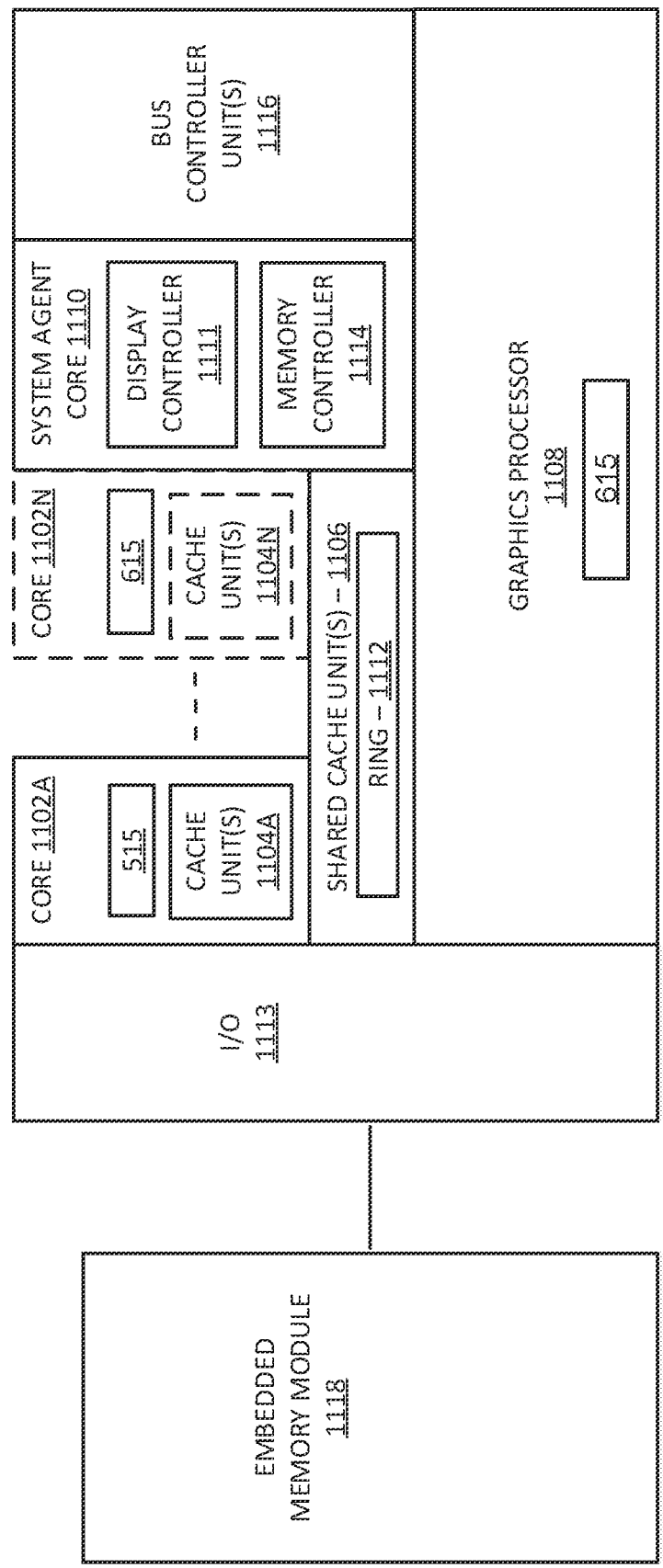
FIG. 11 illustrates at least portions of a graphic processor, in accordance with at least some embodiments.

FIG. 11 is a block diagram of a processor 1100 having one or more processor cores 1102A-1102N, an integrated memory controller 1113, and an integrated graphics processor 1108, according to at least one embodiment. In at least one embodiment, processor 1100 may include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1113 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1113. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 may be implemented on one or more chips or as an SoC integrated circuit.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into processor 1100. For example, in at least one embodiment, training and/or inferencing techniques described herein may use one or more of ALUs embodied in graphics processor 1108, graphics core(s) 1102A-1102N, or other components in FIG. 11. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of graphics processor 1100 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 12:
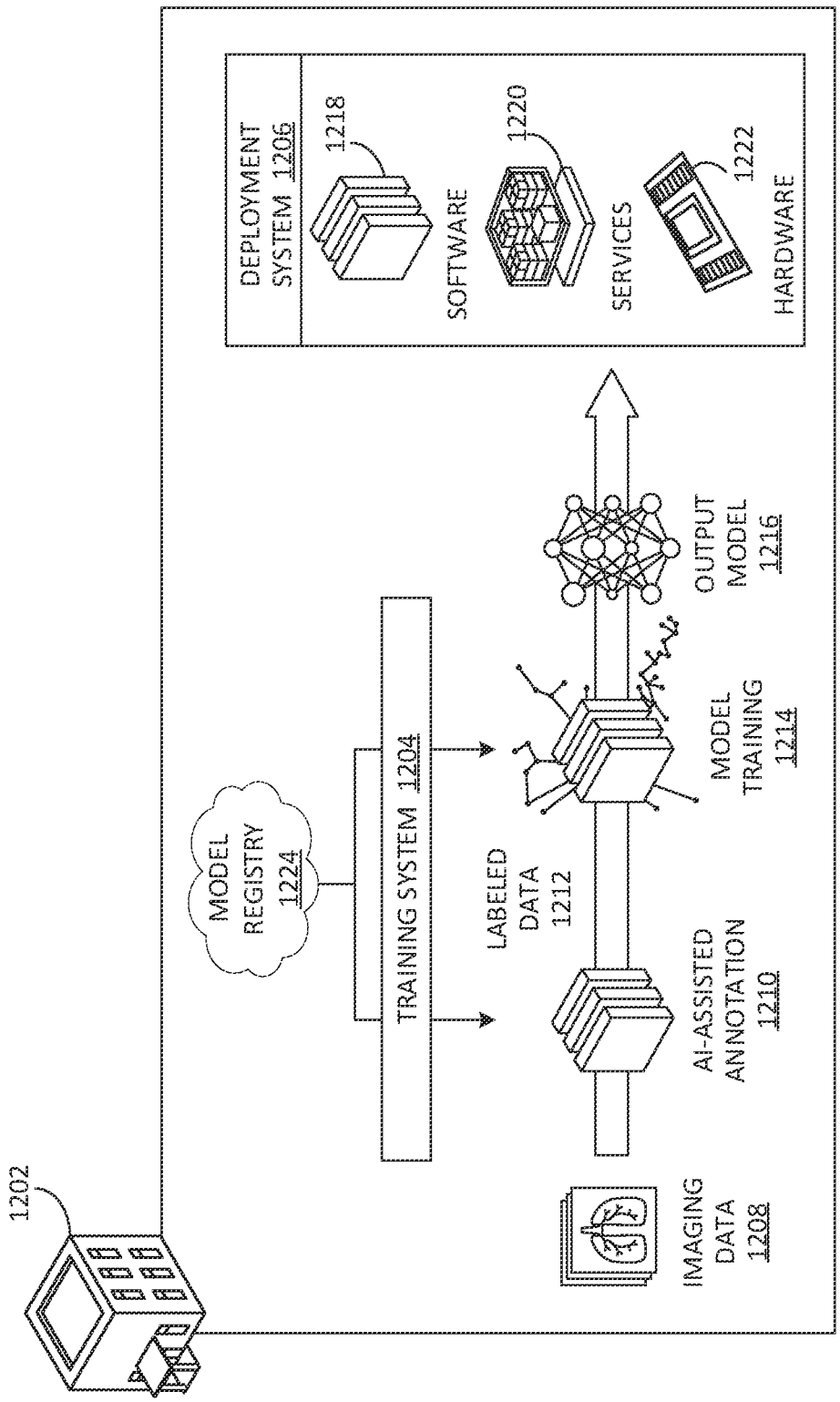
FIG. 12 illustrates an example data flow diagram for an advanced computing pipeline, in accordance with at least some embodiments.

FIG. 12 is an example data flow diagram for a process 1200 of generating and deploying an image processing and inferencing pipeline, in accordance with at least one embodiment. In at least one embodiment, process 1200 may be deployed for use with imaging devices, processing devices, and/or other device types at one or more facilities 1202. Process 1200 may be executed within a training system 1204 and/or a deployment system 1206. In at least one embodiment, training system 1204 may be used to perform training, deployment, and implementation of machine learning models (e.g., neural networks, object detection algorithms, computer vision algorithms, etc.) for use in deployment system 1206. In at least one embodiment, deployment system 1206 may be configured to offload processing and compute resources among a distributed computing environment to reduce infrastructure requirements at facility 1202. In at least one embodiment, one or more applications in a pipeline may use or call upon services (e.g., inference, visualization, compute, AI, etc.) of deployment system 1206 during execution of applications.

In at least one embodiment, some of applications used in advanced processing and inferencing pipelines may use machine learning models or other AI to perform one or more processing steps. In at least one embodiment, machine learning models may be trained at facility 1202 using data 1208 (such as imaging data) generated at facility 1202 (and stored on one or more picture archiving and communication system (PACS) servers at facility 1202), may be trained using imaging or sequencing data 1208 from another facility(ies), or a combination thereof. In at least one embodiment, training system 1204 may be used to provide applications, services, and/or other resources for generating working, deployable machine learning models for deployment system 1206.

In at least one embodiment, model registry 1224 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1224 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1204 (FIG. 12) may include a scenario where facility 1202 is training their own machine learning model, or has an existing machine learning model that needs to be optimized or updated. In at least one embodiment, imaging data 1208 generated by imaging device(s), sequencing devices, and/or other device types may be received. In at least one embodiment, once imaging data 1208 is received, AI-assisted annotation 1210 may be used to aid in generating annotations corresponding to imaging data 1208 to be used as ground truth data for a machine learning model. In at least one embodiment, AI-assisted annotation 1210 may include one or more machine learning models (e.g., convolutional neural networks (CNNs)) that may be trained to generate annotations corresponding to certain types of imaging data 1208 (e.g., from certain devices). In at least one embodiment, AI-assisted annotations 1210 may then be used directly, or may be adjusted or fine-tuned using an annotation tool to generate ground truth data. In at least one embodiment, AI-assisted annotations 1210, labeled clinic data 1212, or a combination thereof may be used as ground truth data for training a machine learning model. In at least one embodiment, a trained machine learning model may be referred to as output model 1216, and may be used by deployment system 1206, as described herein.

In at least one embodiment, training pipeline 1204 (FIG. 12) may include a scenario where facility 1202 needs a machine learning model for use in performing one or more processing tasks for one or more applications in deployment system 1206, but facility 1202 may not currently have such a machine learning model (or may not have a model that is optimized, efficient, or effective for such purposes). In at least one embodiment, an existing machine learning model may be selected from a model registry 1224. In at least one embodiment, model registry 1224 may include machine learning models trained to perform a variety of different inference tasks on imaging data. In at least one embodiment, machine learning models in model registry 1224 may have been trained on imaging data from different facilities than facility 1202 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1224. In at least one embodiment, a machine learning model may then be retrained, or updated, at any number of other facilities, and a retrained or updated model may be made available in model registry 1224. In at least one embodiment, a machine learning model may then be selected from model registry 1224—and referred to as output model 1216—and may be used in deployment system 1206 to perform one or more processing tasks for one or more applications of a deployment system.

In at least one embodiment, training pipeline 1204 (FIG. 12), a scenario may include facility 1202 requiring a machine learning model for use in performing one or more processing tasks for one or more applications in deployment system 1206, but facility 1202 may not currently have such a machine learning model (or may not have a model that is optimized, efficient, or effective for such purposes). In at least one embodiment, a machine learning model selected from model registry 1224 may not be fine-tuned or optimized for imaging data 1208 generated at facility 1202 because of differences in populations, robustness of training data used to train a machine learning model, diversity in anomalies of training data, and/or other issues with training data. In at least one embodiment, AI-assisted annotation 1210 may be used to aid in generating annotations corresponding to imaging data 1208 to be used as ground truth data for retraining or updating a machine learning model. In at least one embodiment, labeled data 1212 may be used as ground truth data for training a machine learning model. In at least one embodiment, retraining or updating a machine learning model may be referred to as model training 1214. In at least one embodiment, model training 1214—e.g., AI-assisted annotations 1210, labeled clinic data 1212, or a combination thereof—may be used as ground truth data for retraining or updating a machine learning model. In at least one embodiment, a trained machine learning model may be referred to as output model 1216, and may be used by deployment system 1206, as described herein.

In at least one embodiment, deployment system 1206 may include software 1218, services 1220, hardware 1222, and/or other components, features, and functionality. In at least one embodiment, deployment system 1206 may include a software "stack," such that software 1218 may be built on top of services 1220 and may use services 1220 to perform some or all of processing tasks, and services 1220 and software 1218 may be built on top of hardware 1222 and use hardware 1222 to execute processing, storage, and/or other compute tasks of deployment system 1206. In at least one embodiment, software 1218 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1208, in addition to containers that receive and configure imaging data for use by each container and/or for use by facility 1202 after processing through a pipeline (e.g., to convert outputs back to a usable data type). In at least one embodiment, a combination of containers within software 1218 (e.g., that make up a pipeline) may be referred to as a virtual instrument (as described in more detail herein), and a virtual instrument may leverage services 1220 and hardware 1222 to execute some or all processing tasks of applications instantiated in containers.

In at least one embodiment, a data processing pipeline may receive input data (e.g., imaging data 1208) in a specific format in response to an inference request (e.g., a request from a user of deployment system 1206). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1216 of training system 1204.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1224 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1220 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1200 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1200 of FIG. 12). In at least one embodiment, completed and validated applications or containers may be stored in a container registry and associated machine learning models may be stored in model registry 1224. In at least one embodiment, a requesting entity—who provides an inference or image processing request—may browse a container registry and/or model registry 1224 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1206 (e.g., a cloud) to perform processing of data processing pipeline. In at least one embodiment, processing by deployment system 1206 may include referencing selected elements (e.g., applications, containers, models, etc.) from a container registry and/or model registry 1224. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1220 may be leveraged. In at least one embodiment, services 1220 may include compute services, artificial intelligence (AI) services, visualization services, and/or other service types. In at least one embodiment, services 1220 may provide functionality that is common to one or more applications in software 1218, so functionality may be abstracted to a service that may be called upon or leveraged by applications. In at least one embodiment, functionality provided by services 1220 may run dynamically and more efficiently, while also scaling well by allowing applications to process data in parallel (e.g., using a parallel computing platform 1230 (FIG. 12)). In at least one embodiment, rather than each application that shares a same functionality offered by a service 1220 being required to have a respective instance of service 1220, service 1220 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1220 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1218 implementing advanced processing and inferencing pipeline that includes segmentation application and anomaly detection application may be streamlined because each application may call upon a same inference service to perform one or more inferencing tasks.

In at least one embodiment, hardware 1222 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1222 may be used to provide efficient, purpose-built support for software 1218 and services 1220 in deployment system 1206. In at least one embodiment, use of GPU processing may be implemented for processing locally (e.g., at facility 1202), within an AI/deep learning system, in a cloud system, and/or in other processing components of deployment system 1206 to improve efficiency, accuracy, and efficacy of image processing and generation. In at least one embodiment, software 1218 and/or services 1220 may be optimized for GPU processing with respect to deep learning, machine learning, and/or high-performance computing, as non-limiting examples. In at least one embodiment, at least some of computing environment of deployment system 1206 and/or training system 1204 may be executed in a datacenter one or more supercomputers or high performance computing systems, with GPU optimized software (e.g., hardware and software combination of NVIDIA's DGX System). In at least one embodiment, hardware 1222 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 13:
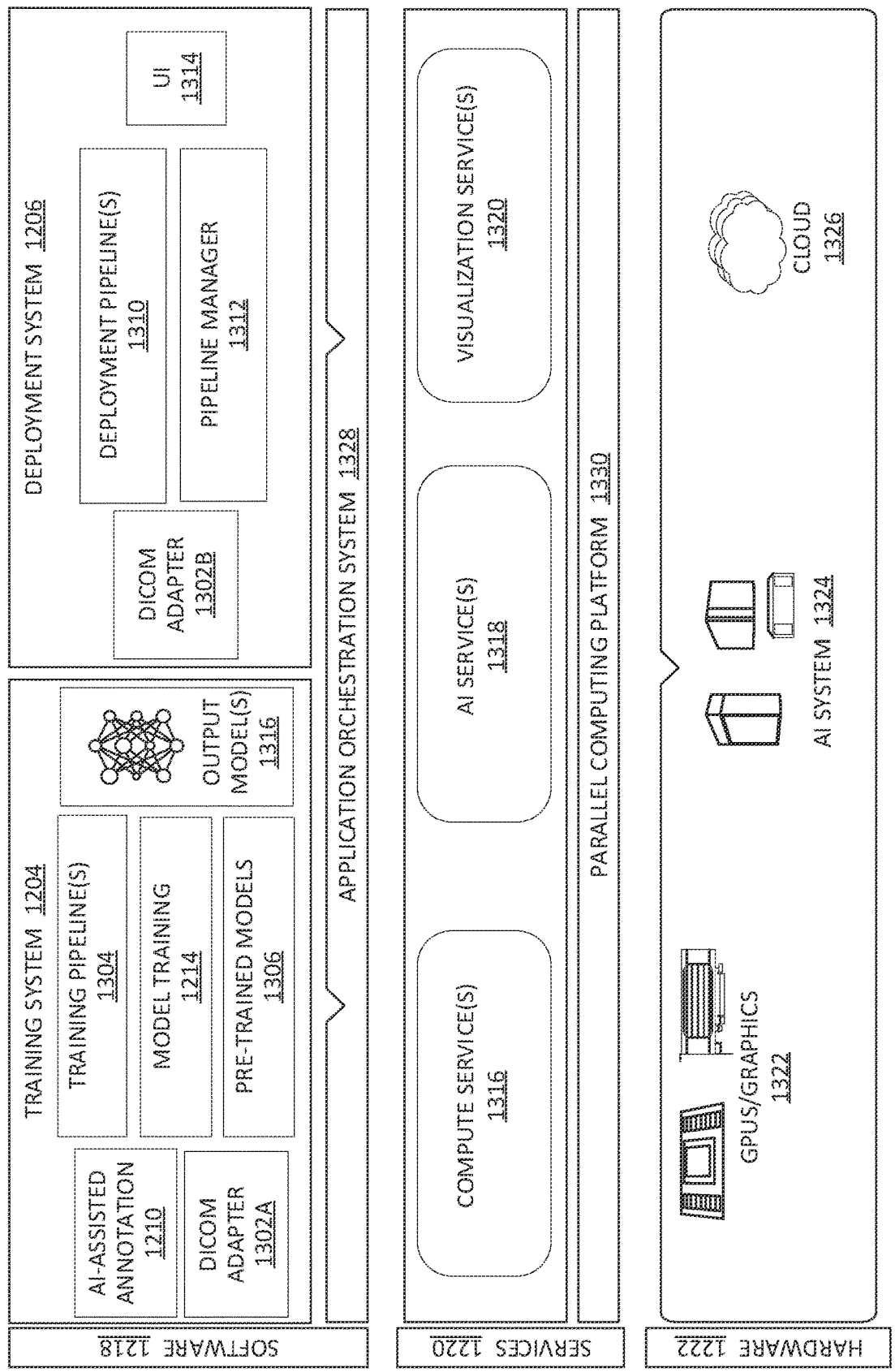
FIG. 13 illustrates a system diagram for an example system for training, adapting, instantiating, and deploying machine learning models in an advanced computing pipeline, in accordance with at least some embodiment.

FIG. 13 is a system diagram for an example system 1300 for generating and deploying an imaging deployment pipeline, in accordance with at least one embodiment. In at least one embodiment, system 1300 may be used to implement process 1200 of FIG. 12 and/or other processes including advanced processing and inferencing pipelines. In at least one embodiment, system 1300 may include training system 1204 and deployment system 1206. In at least one embodiment, training system 1204 and deployment system 1206 may be implemented using software 1218, services 1220, and/or hardware 1222, as described herein.

In at least one embodiment, system 1300 (e.g., training system 1204 and/or deployment system 1206) may implemented in a cloud computing environment (e.g., using cloud 1326). In at least one embodiment, system 1300 may be implemented locally with respect to a healthcare services facility, or as a combination of both cloud and local computing resources. In at least one embodiment, access to APIs in cloud 1326 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1300, may be restricted to a set of public IPs that have been vetted or authorized for interaction.

In at least one embodiment, various components of system 1300 may communicate between and among one another using any of a variety of different network types, including but not limited to local area networks (LANs) and/or wide area networks (WANs) via wired and/or wireless communication protocols. In at least one embodiment, communication between facilities and components of system 1300 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1204 may execute training pipelines 1304, similar to those described herein with respect to FIG. 12. In at least one embodiment, where one or more machine learning models are to be used in deployment pipelines 1310 by deployment system 1206, training pipelines 1304 may be used to train or retrain one or more (e.g. pre-trained) models, and/or implement one or more of pre-trained models 1306 (e.g., without a need for retraining or updating). In at least one embodiment, as a result of training pipelines 1304, output model(s) 1216 may be generated. In at least one embodiment, training pipelines 1304 may include any number of processing steps, such as but not limited to imaging data (or other input data) conversion or adaption In at least one embodiment, for different machine learning models used by deployment system 1206, different training pipelines 1304 may be used. In at least one embodiment, training pipeline 1304 similar to a first example described with respect to FIG. 12 may be used for a first machine learning model, training pipeline 1304 similar to a second example described with respect to FIG. 12 may be used for a second machine learning model, and training pipeline 1304 similar to a third example described with respect to FIG. 12 may be used for a third machine learning model. In at least one embodiment, any combination of tasks within training system 1204 may be used depending on what is required for each respective machine learning model. In at least one embodiment, one or more of machine learning models may already be trained and ready for deployment so machine learning models may not undergo any processing by training system 1204, and may be implemented by deployment system 1206.

In at least one embodiment, output model(s) 1216 and/or pre-trained model(s) 1306 may include any types of machine learning models depending on implementation or embodiment. In at least one embodiment, and without limitation, machine learning models used by system 1300 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1304 may include AI-assisted annotation, as described in more detail herein with respect to at least FIG. 12B. In at least one embodiment, labeled data 1212 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1208 (or other data type used by machine learning models), there may be corresponding ground truth data generated by training system 1204. In at least one embodiment, AI-assisted annotation may be performed as part of deployment pipelines 1310; either in addition to, or in lieu of AI-assisted annotation included in training pipelines 1304. In at least one embodiment, system 1300 may include a multi-layer platform that may include a software layer (e.g., software 1218) of diagnostic applications (or other application types) that may perform one or more medical imaging and diagnostic functions. In at least one embodiment, system 1300 may be communicatively coupled to (e.g., via encrypted links) PACS server networks of one or more facilities. In at least one embodiment, system 1300 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1202). In at least one embodiment, applications may then call or execute one or more services 1220 for performing compute, AI, or visualization tasks associated with respective applications, and software 1218 and/or services 1220 may leverage hardware 1222 to perform processing tasks in an effective and efficient manner.

In at least one embodiment, deployment system 1206 may execute deployment pipelines 1310. In at least one embodiment, deployment pipelines 1310 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1310 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1310 depending on information desired from data generated by a device. In at least one embodiment, where detections of anomalies are desired from an MRI machine, there may be a first deployment pipeline 1310, and where image enhancement is desired from output of an MRI machine, there may be a second deployment pipeline 1310.

In at least one embodiment, an image generation application may include a processing task that includes use of a machine learning model. In at least one embodiment, a user may desire to use their own machine learning model, or to select a machine learning model from model registry 1224. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1300—such as services 1220 and hardware 1222—deployment pipelines 1310 may be even more user friendly, provide for easier integration, and produce more accurate, efficient, and timely results.

In at least one embodiment, deployment system 1206 may include a user interface 1314 (e.g., a graphical user interface, a web interface, etc.) that may be used to select applications for inclusion in deployment pipeline(s) 1310, arrange applications, modify, or change applications or parameters or constructs thereof, use and interact with deployment pipeline(s) 1310 during set-up and/or deployment, and/or to otherwise interact with deployment system 1206. In at least one embodiment, although not illustrated with respect to training system 1204, user interface 1314 (or a different user interface) may be used for selecting models for use in deployment system 1206, for selecting models for training, or retraining, in training system 1204, and/or for otherwise interacting with training system 1204.

In at least one embodiment, pipeline manager 1312 may be used, in addition to an application orchestration system 1328, to manage interaction between applications or containers of deployment pipeline(s) 1310 and services 1220 and/or hardware 1222. In at least one embodiment, pipeline manager 1312 may be configured to facilitate interactions from application to application, from application to service 1220, and/or from application or service to hardware 1222. In at least one embodiment, although illustrated as included in software 1218, this is not intended to be limiting, and in some examples (e.g., as illustrated in FIG. 11) pipeline manager 1312 may be included in services 1220. In at least one embodiment, application orchestration system 1328 (e.g., Kubernetes, DOCKER, etc.) may include a container orchestration system that may group applications into containers as logical units for coordination, management, scaling, and deployment. In at least one embodiment, by associating applications from deployment pipeline(s) 1310 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1312 and application orchestration system 1328. In at least one embodiment, so long as an expected input and/or output of each container or application is known by a system (e.g., based on constructs of applications or containers), application orchestration system 1328 and/or pipeline manager 1312 may facilitate communication among and between, and sharing of resources among and between, each of applications or containers. In at least one embodiment, because one or more of applications or containers in deployment pipeline(s) 1310 may share same services and resources, application orchestration system 1328 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1328) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1220 leveraged by and shared by applications or containers in deployment system 1206 may include compute services 1316, AI services 1318, visualization services 1320, and/or other service types. In at least one embodiment, applications may call (e.g., execute) one or more of services 1220 to perform processing operations for an application. In at least one embodiment, compute services 1316 may be leveraged by applications to perform super-computing or other high-performance computing (HPC) tasks. In at least one embodiment, compute service(s) 1316 may be leveraged to perform parallel processing (e.g., using a parallel computing platform 1330) for processing data through one or more of applications and/or one or more tasks of a single application, substantially simultaneously. In at least one embodiment, parallel computing platform 1330 (e.g., NVIDIA's CUDA) may enable general purpose computing on GPUs (GPGPU) (e.g., GPUs 1322). In at least one embodiment, a software layer of parallel computing platform 1330 may provide access to virtual instruction sets and parallel computational elements of GPUs, for execution of compute kernels. In at least one embodiment, parallel computing platform 1330 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1330 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1318 may be leveraged to perform inferencing services for executing machine learning model(s) associated with applications (e.g., tasked with performing one or more processing tasks of an application). In at least one embodiment, AI services 1318 may leverage AI system 1324 to execute machine learning model(s) (e.g., neural networks, such as CNNs) for segmentation, reconstruction, object detection, feature detection, classification, and/or other inferencing tasks. In at least one embodiment, applications of deployment pipeline(s) 1310 may use one or more of output models 1216 from training system 1204 and/or other models of applications to perform inference on imaging data. In at least one embodiment, two or more examples of inferencing using application orchestration system 1328 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1328 may distribute resources (e.g., services 1220 and/or hardware 1222) based on priority paths for different inferencing tasks of AI services 1318.

In at least one embodiment, shared storage may be mounted to AI services 1318 within system 1300. In at least one embodiment, shared storage may operate as a cache (or other storage device type) and may be used to process inference requests from applications. In at least one embodiment, when an inference request is submitted, a request may be received by a set of API instances of deployment system 1206, and one or more instances may be selected (e.g., for best fit, for load balancing, etc.) to process a request. In at least one embodiment, to process a request, a request may be entered into a database, a machine learning model may be located from model registry 1224 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1312) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<12 min). In at least one embodiment, model execution times may be measured from requesting institution or entity and may include partner network traversal time, as well as execution on an inference service.

In at least one embodiment, transfer of requests between services 1220 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1326, and an inference service may perform inferencing on a GPU.

In at least one embodiment, visualization services 1320 may be leveraged to generate visualizations for viewing outputs of applications and/or deployment pipeline(s) 1310. In at least one embodiment, GPUs 1322 may be leveraged by visualization services 1320 to generate visualizations. In at least one embodiment, rendering effects, such as ray-tracing, may be implemented by visualization services 1320 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1320 may include an internal visualizer, cinematics, and/or other rendering or image processing capabilities or functionality (e.g., ray tracing, rasterization, internal optics, etc.).

In at least one embodiment, hardware 1222 may include GPUs 1322, AI system 1324, cloud 1326, and/or any other hardware used for executing training system 1204 and/or deployment system 1606. In at least one embodiment, GPUs 1322 (e.g., NVIDIA's TESLA and/or QUADRO GPUs) may include any number of GPUs that may be used for executing processing tasks of compute services 1316, AI services 1318, visualization services 1320, other services, and/or any of features or functionality of software 1218. For example, with respect to AI services 1318, GPUs 1322 may be used to perform pre-processing on imaging data (or other data types used by machine learning models), post-processing on outputs of machine learning models, and/or to perform inferencing (e.g., to execute machine learning models). In at least one embodiment, cloud 1326, AI system 1324, and/or other components of system 1300 may use GPUs 1322. In at least one embodiment, cloud 1326 may include a GPU-optimized platform for deep learning tasks. In at least one embodiment, AI system 1324 may use GPUs, and cloud 1326—or at least a portion tasked with deep learning or inferencing—may be executed using one or more AI systems 1324. As such, although hardware 1222 is illustrated as discrete components, this is not intended to be limiting, and any components of hardware 1222 may be combined with, or leveraged by, any other components of hardware 1222.

In at least one embodiment, AI system 1324 may include a purpose-built computing system (e.g., a super-computer or an HPC) configured for inferencing, deep learning, machine learning, and/or other artificial intelligence tasks. In at least one embodiment, AI system 1324 (e.g., NVIDIA's DGX) may include GPU-optimized software (e.g., a software stack) that may be executed using a plurality of GPUs 1322, in addition to DPUs, CPUs, RAM, storage, and/or other components, features, or functionality. In at least one embodiment, one or more AI systems 1324 may be implemented in cloud 1326 (e.g., in a data center) for performing some or all of AI-based processing tasks of system 1300.

In at least one embodiment, cloud 1326 may include a GPU-accelerated infrastructure (e.g., NVIDIA's NGC) that may provide a GPU-optimized platform for executing processing tasks of system 1300. In at least one embodiment, cloud 1326 may include an AI system(s) 1324 for performing one or more of AI-based tasks of system 1300 (e.g., as a hardware abstraction and scaling platform). In at least one embodiment, cloud 1326 may integrate with application orchestration system 1328 leveraging multiple GPUs to enable seamless scaling and load balancing between and among applications and services 1220. In at least one embodiment, cloud 1326 may tasked with executing at least some of services 1220 of system 1300, including compute services 1316, AI services 1318, and/or visualization services 1320, as described herein. In at least one embodiment, cloud 1326 may perform small and large batch inference (e.g., executing NVIDIA's TENSOR RT), provide an accelerated parallel computing API and platform 1330 (e.g., NVIDIA's CUDA), execute application orchestration system 1328 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1300.

Figure 14A:
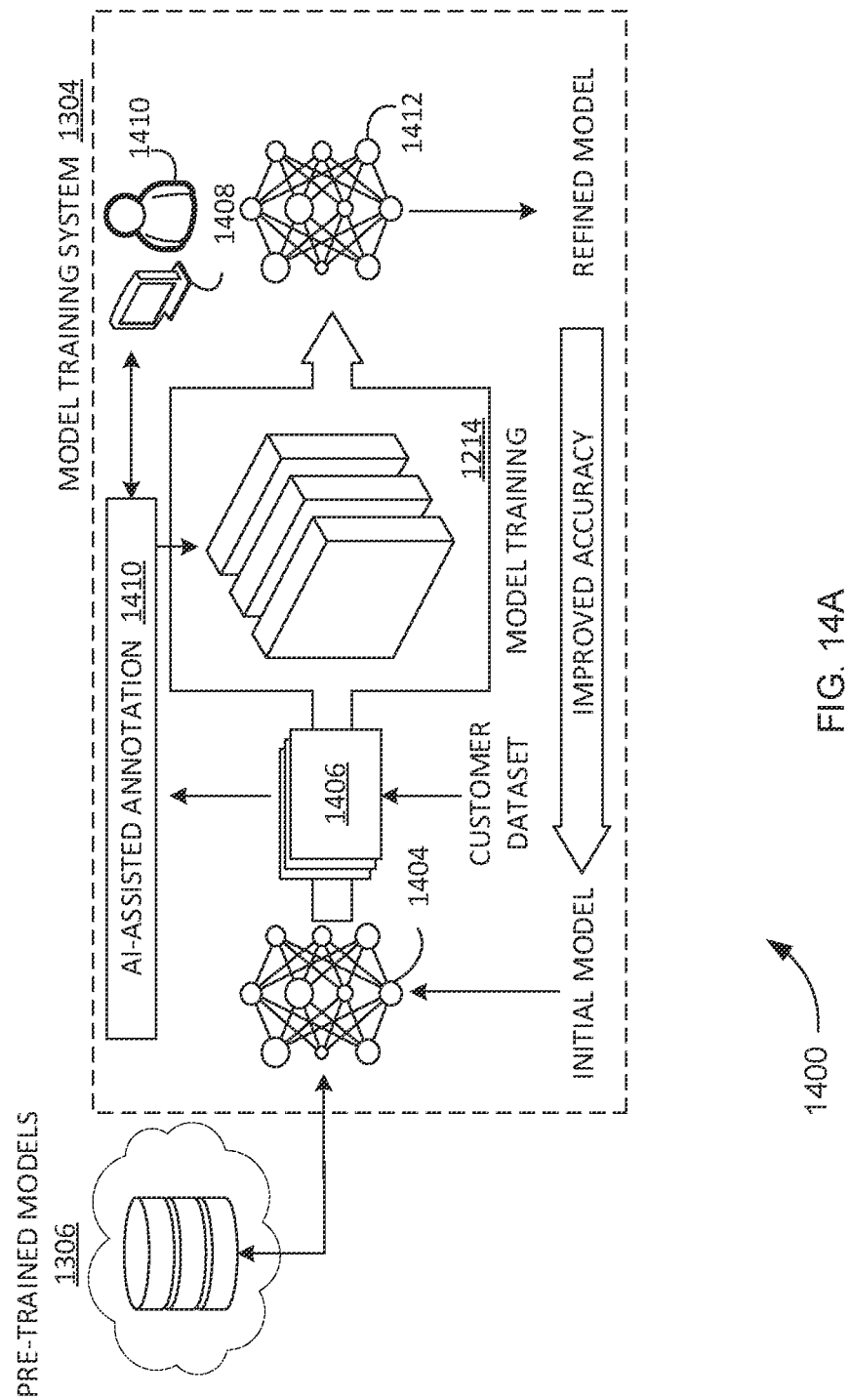
FIGS. 14A and 14B illustrate a data flow diagram for a process to train a machine learning model, as well as client-server architecture to enhance annotation tools with pre-trained annotation models, in accordance with at least some embodiments.

FIG. 14A illustrates a data flow diagram for a process 1400 to train, retrain, or update a machine learning model, in accordance with at least one embodiment. In at least one embodiment, process 1400 may be executed using, as a non-limiting example, system 1300 of FIG. 13. In at least one embodiment, process 1400 may leverage services 1220 and/or hardware 1222 of system 1300, as described herein. In at least one embodiment, refined models 1412 generated by process 1400 may be executed by deployment system 1206 for one or more containerized applications in deployment pipelines 1310.

In at least one embodiment, model training 1214 may include retraining or updating an initial model 1404 (e.g., a pre-trained model) using new training data (e.g., new input data, such as customer dataset 1406, and/or new ground truth data associated with input data). In at least one embodiment, to retrain, or update, initial model 1404, output or loss layer(s) of initial model 1404 may be reset, or deleted, and/or replaced with an updated or new output or loss layer(s). In at least one embodiment, initial model 1404 may have previously fine-tuned parameters (e.g., weights and/or biases) that remain from prior training, so training or retraining 1214 may not take as long or require as much processing as training a model from scratch. In at least one embodiment, during model training 1214, by having reset or replaced output or loss layer(s) of initial model 1404, parameters may be updated and re-tuned for a new data set based on loss calculations associated with accuracy of output or loss layer(s) at generating predictions on new, customer dataset 1406 (e.g., image data 1208 of FIG. 12).

In at least one embodiment, pre-trained models 1306 may be stored in a data store, or registry (e.g., model registry 1224 of FIG. 12). In at least one embodiment, pre-trained models 1306 may have been trained, at least in part, at one or more facilities other than a facility executing process 1400. In at least one embodiment, to protect privacy and rights of patients, subjects, or clients of different facilities, pre-trained models 1306 may have been trained, on-premise, using customer or patient data generated on-premise. In at least one embodiment, pre-trained models 1306 may be trained using cloud 1326 and/or other hardware 1222, but confidential, privacy protected patient data may not be transferred to, used by, or accessible to any components of cloud 1326 (or other off premise hardware). In at least one embodiment, where a pre-trained model 1306 is trained at using patient data from more than one facility, pre-trained model 1306 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1306 on-premise and/or off premise, such as in a datacenter or other cloud computing infrastructure.

In at least one embodiment, when selecting applications for use in deployment pipelines 1310, a user may also select machine learning models to be used for specific applications. In at least one embodiment, a user may not have a model for use, so a user may select a pre-trained model 1306 to use with an application. In at least one embodiment, pre-trained model 1306 may not be optimized for generating accurate results on customer dataset 1406 of a facility of a user (e.g., based on patient diversity, demographics, types of medical imaging devices used, etc.). In at least one embodiment, prior to deploying pre-trained model 1306 into deployment pipeline 1310 for use with an application(s), pre-trained model 1306 may be updated, retrained, and/or fine-tuned for use at a respective facility.

In at least one embodiment, a user may select pre-trained model 1306 that is to be updated, retrained, and/or fine-tuned, and pre-trained model 1306 may be referred to as initial model 1404 for training system 1204 within process 1400. In at least one embodiment, customer dataset 1406 (e.g., imaging data, genomics data, sequencing data, or other data types generated by devices at a facility) may be used to perform model training 1214 (which may include, without limitation, transfer learning) on initial model 1404 to generate refined model 1412. In at least one embodiment, ground truth data corresponding to customer dataset 1406 may be generated by training system 1204. In at least one embodiment, ground truth data may be generated, at least in part, by clinicians, scientists, doctors, practitioners, at a facility (e.g., as labeled clinic data 1212 of FIG. 12).

In at least one embodiment, AI-assisted annotation 1210 may be used in some examples to generate ground truth data. In at least one embodiment, AI-assisted annotation 1210 (e.g., implemented using an AI-assisted annotation SDK) may leverage machine learning models (e.g., neural networks) to generate suggested or predicted ground truth data for a customer dataset. In at least one embodiment, user 1410 may use annotation tools within a user interface (a graphical user interface (GUI)) on computing device 1408.

In at least one embodiment, user 1410 may interact with a GUI via computing device 1408 to edit or fine-tune (auto)annotations. In at least one embodiment, a polygon editing feature may be used to move vertices of a polygon to more accurate or fine-tuned locations.

In at least one embodiment, once customer dataset 1406 has associated ground truth data, ground truth data (e.g., from AI-assisted annotation, manual labeling, etc.) may be used by during model training 1214 to generate refined model 1412. In at least one embodiment, customer dataset 1406 may be applied to initial model 1404 any number of times, and ground truth data may be used to update parameters of initial model 1404 until an acceptable level of accuracy is attained for refined model 1412. In at least one embodiment, once refined model 1412 is generated, refined model 1412 may be deployed within one or more deployment pipelines 1210 at a facility for performing one or more processing tasks with respect to medical imaging data.

In at least one embodiment, refined model 1412 may be uploaded to pre-trained models 1206 in model registry 1224 to be selected by another facility. In at least one embodiment, his process may be completed at any number of facilities such that refined model 1412 may be further refined on new datasets any number of times to generate a more universal model.

Figure 14B:
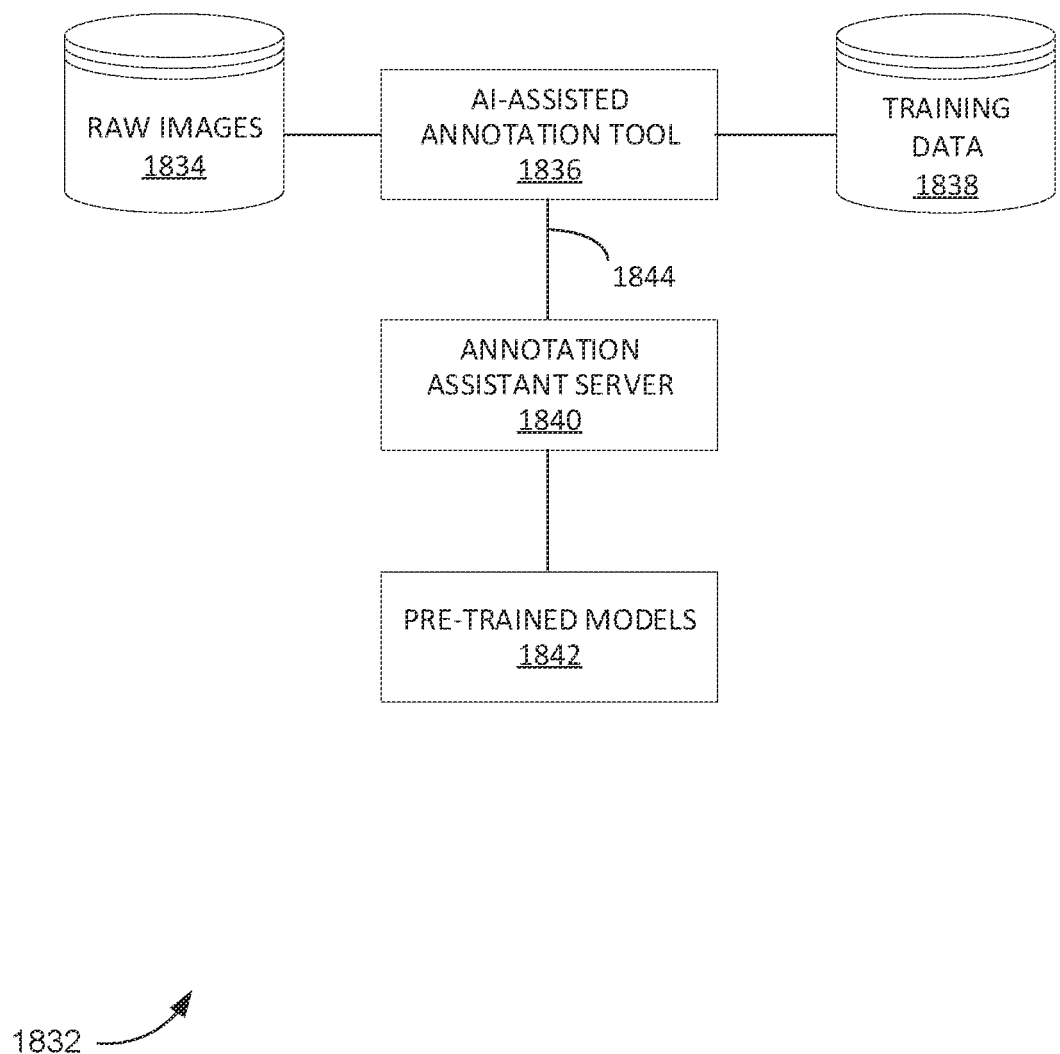

FIG. 14B is an example illustration of a client-server architecture 1432 to enhance annotation tools with pre-trained annotation models, in accordance with at least one embodiment. In at least one embodiment, AI-assisted annotation tools 1436 may be instantiated based on a client-server architecture 1432. In at least one embodiment, annotation tools 1436 in imaging applications may aid radiologists, for example, identify organs and abnormalities. In at least one embodiment, imaging applications may include software tools that help user 1410 to identify, as a non-limiting example, a few extreme points on a particular organ of interest in raw images 1434 (e.g., in a 3D MRI or CT scan) and receive auto-annotated results for all 2D slices of a particular organ. In at least one embodiment, results may be stored in a data store as training data 1438 and used as (for example and without limitation) ground truth data for training. In at least one embodiment, when computing device 1408 sends extreme points for AI-assisted annotation 1210, a deep learning model, for example, may receive this data as input and return inference results of a segmented organ or abnormality. In at least one embodiment, pre-instantiated annotation tools, such as AI-Assisted Annotation Tool 1436B in FIG. 14B, may be enhanced by making API calls (e.g., API Call 1444) to a server, such as an Annotation Assistant Server 1440 that may include a set of pre-trained models 1442 stored in an annotation model registry, for example. In at least one embodiment, an annotation model registry may store pre-trained models 1442 (e.g., machine learning models, such as deep learning models) that are pre-trained to perform AI-assisted annotation on a particular organ or abnormality. These models may be further updated by using training pipelines 1304. In at least one embodiment, pre-installed annotation tools may be improved over time as new labeled clinic data 1212 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:

determining, using a processing device, a set of observations from coolant data received from one or more sensors in an environment associated with a coolant in a datacenter cooling system, the set of observations comprising at least one of: a fluid turbidity measurement, a pressure measurement, a conductivity measurement, or a potential hydrogen (pH) level measurement;

determining, using the processing device, performance data including at least one of power consumption measurements, temperature measurements, or clock frequency measurements of one or more computing devices;

processing the set of observations with the performance data using a machine learning model that determines whether the set of observations matches a contaminated coolant profile or an uncontaminated coolant profile and outputs a contamination level of the coolant based on a result of the processing; and initiating predictive maintenance of the datacenter cooling system, using the processing device, responsive to determining the coolant contamination level and that the coolant data matches a contaminated coolant profile.

2. The method of claim 1, further comprising:

receiving, using the processing device, second coolant data from the one or more sensors;

determining, using the processing device, a second set of observations from the second coolant data;

determining, using the machine learning model and the second set of observations, a second contamination level of the coolant; and refraining from initiating the predictive maintenance responsive to detecting the coolant is uncontaminated.

3. The method of claim 1, wherein the one or more sensors include at least one of a light spectroscopy sensor, a fluid turbidity sensor, a pressure sensor, a potential hydrogen (pH) sensor, or a conductivity sensor.

4. The method of claim 1, further comprising:

determining, using the processing device, a second set of observations from a second set of data, the second set of data including network information wherein detecting whether the coolant is contaminated or uncontaminated is based on at least in part using the second set of observations.

5. The method of claim 1, wherein the machine learning model comprises one of a classification model, a feature detection model, an anomaly detection model, or a pattern recognition model trained to detect whether the coolant is contaminated or uncontaminated.

6. The method of claim 1, wherein the predictive maintenance comprises one of transmitting an alert the coolant is contaminated, initiating a contamination analysis, determining a temperature of one or more devices of the environment, initiating a fluid analysis, or determining a thermal resistance of one or more devices associated with the coolant.

7. The method of claim 1, further comprising:

determining, using the machine learning model and the set of observations, that the coolant will become contaminated responsive to determining the set of observations.

8. The method of claim 1, wherein the coolant data collected by the one or more sensors is received by the processing device remotely.

9. A system comprising:

a processing device to:

determine a set of observations from coolant data being received from one or more sensors in a computing environment associated with a coolant in a datacenter cooling system, the set of observations comprising at least one of: a fluid turbidity measurement, a pressure measurement, a conductivity measurement, or a potential hydrogen (pH) level measurement;

determine performance data including at least one of power consumption measurements, temperature measurements, or clock frequency measurements of one or more computing devices;

process the set of observations with the performance data using a machine learning model that determines whether the set of observations matches a contaminated coolant profile or an uncontaminated coolant profile and outputs a contamination level of the coolant based on a result of processing the set of observations; and initiate predictive maintenance of the datacenter cooling system, using the processing device, responsive to determining the coolant contamination level and that the coolant data matches a contaminated coolant profile.

10. The system of claim 9, wherein the processing device is further to:

receive second coolant data from the one or more sensors;

determine a second set of observations from the second coolant data;

determine, using the machine learning model and the second set of observations, a second contamination level of the coolant; and refrain from initiating the predictive maintenance responsive to determining the coolant is uncontaminated.

11. The system of claim 9, wherein the one or more sensors include at least one of a light spectroscopy sensor, a fluid turbidity sensor, a pressure sensor, a potential hydrogen (pH) sensor, or a conductivity sensor.

12. The system of claim 9, wherein the predictive maintenance comprises one of transmitting an alert the coolant is contaminated, initiating a contamination analysis, determining a temperature of one or more devices of the computing environment, initiating a fluid analysis, or determining a thermal resistance of one or more devices associated with the coolant.

13. The system of claim 9, wherein the coolant data collected by the one or more sensors is received by the processing device remotely.

14. A method, comprising:

determining, using a processing device, a set of observations from coolant data received from one or more sensors associated with a first portion of a computing environment associated with a coolant in a datacenter cooling system, the set of observations comprising at least one of: a fluid turbidity measurement, a pressure measurement, a conductivity measurement, or a potential Hydrogen (pH) level measurement;

determining, using the processing device, performance data including at least one of power consumption measurements, temperature measurements, or clock frequency measurements of one or more computing devices;

training, using the set of observations and the performance data, a machine learning (ML) model to determine a cooling efficiency and power efficiency associated with the first portion;

determining, using the ML model, the cooling efficiency and power efficiency associated with a second portion of the computing environment; and determining whether to initiate predictive maintenance of the datacenter cooling system at the first portion or the second portion responsive to determining the cooling efficiency and power efficiency associated with the second portion.

15. The method of claim 14, wherein the computing environment comprises a plurality of portions, including the first portion and the second portion, and the method further comprises:

determining, using the ML model, a second cooling efficiency and second power efficiency associated with each portion of the plurality of portions of the computing environment; and determining a third portion to perform a second operation responsive to determining the second cooling efficiency and power efficiency associated with each portion of the plurality of portions.

16. The method of claim 14, further comprising;

determining, using the processing device, a second set of observations from a second coolant data, the second coolant data being received from a second set of one or more sensors associated with the second portion of the computing environment, wherein determining the cooling efficiency and power efficiency associated with the second portion is based at least in part on determining the second set of observations.

* * * * *